(12) United States Patent
Sekiguchi et al.

(10) Patent No.: US 12,385,208 B2
(45) Date of Patent: Aug. 12, 2025

(54) PILE DRIVING APPARATUS AND CONSTRUCTION MACHINE

(71) Applicant: JDC Corporation, Tokyo (JP)

(72) Inventors: Masakazu Sekiguchi, Tokyo (JP); Hidetoshi Morimoto, Tokyo (JP); Hiroshi Obata, Tokyo (JP); Tsukasa Baba, Tokyo (JP)

(73) Assignee: JDC Corporation, Tokyo (JP)

( * ) Notice: Subject to any disclaimer, the term of this patent is extended or adjusted under 35 U.S.C. 154(b) by 102 days.

(21) Appl. No.: 18/032,287

(22) PCT Filed: Apr. 8, 2021

(86) PCT No.: PCT/JP2021/014904
§ 371 (c)(1),
(2) Date: Apr. 17, 2023

(87) PCT Pub. No.: WO2022/097315
PCT Pub. Date: May 12, 2022

(65) Prior Publication Data
US 2023/0392338 A1 Dec. 7, 2023

Related U.S. Application Data

(60) Provisional application No. 63/109,366, filed on Nov. 4, 2020.

(51) Int. Cl.
*E02D 7/18* (2006.01)
*B64U 70/92* (2023.01)
(Continued)

(52) U.S. Cl.
CPC ............... *E02D 7/18* (2013.01); *B64U 70/92* (2023.01); *B66C 1/02* (2013.01); *E02D 13/00* (2013.01);
(Continued)

(58) Field of Classification Search
CPC .......... E02D 7/18; E02D 13/00; E02D 13/06; E02D 2600/40; B64U 70/92; B64U 2102/30; B66C 1/02
See application file for complete search history.

(56) References Cited

U.S. PATENT DOCUMENTS

| 2013/0236280 A1* | 9/2013 | Yui | E02F 3/964 |
| | | | 414/685 |
| 2015/0321594 A1* | 11/2015 | Harms, Jr. | E02F 3/8816 |
| | | | 406/40 |
| 2020/0218286 A1 | 7/2020 | Tamasato | |

FOREIGN PATENT DOCUMENTS

| CN | 105421453 A | 3/2016 |
| JP | H06-280263 A | 10/1994 |
(Continued)

OTHER PUBLICATIONS

Internatioanl Search Report in PCT/JP2021/014904, mailed Jun. 29, 2021, and its English translation, 5 pgs.

*Primary Examiner* — Kyle Armstrong
(74) *Attorney, Agent, or Firm* — Young Basile Hanlon & MacFarlane, P.C.

(57) ABSTRACT

A pile driving apparatus is described that is capable of simultaneously pile driving a plurality of piles. The pile driving apparatus includes a main body that travels by a traveling device, a first pile driver that is connected to the main body and performs pile driving along a vertical direction, and a second pile driver that is connected to the main body and performs pile driving along the vertical direction.

19 Claims, 18 Drawing Sheets

(51) Int. Cl.
*B66C 1/02* (2006.01)
*E02D 13/00* (2006.01)
*E02D 13/06* (2006.01)
*B64U 101/30* (2023.01)

(52) U.S. Cl.
CPC .......... *E02D 13/06* (2013.01); *B64U 2101/30* (2023.01); *E02D 2600/40* (2013.01)

(56) References Cited

FOREIGN PATENT DOCUMENTS

| | | |
|---|---|---|
| JP | 2002-180465 A | 6/2002 |
| JP | 2014-163191 A | 9/2014 |
| JP | 2015-113668 A | 6/2015 |
| JP | 2019-132062 A | 8/2019 |
| WO | 2019/026169 A1 | 2/2019 |

* cited by examiner

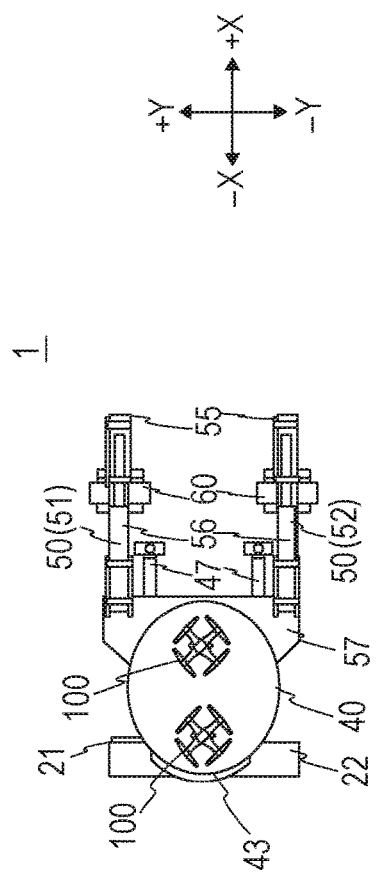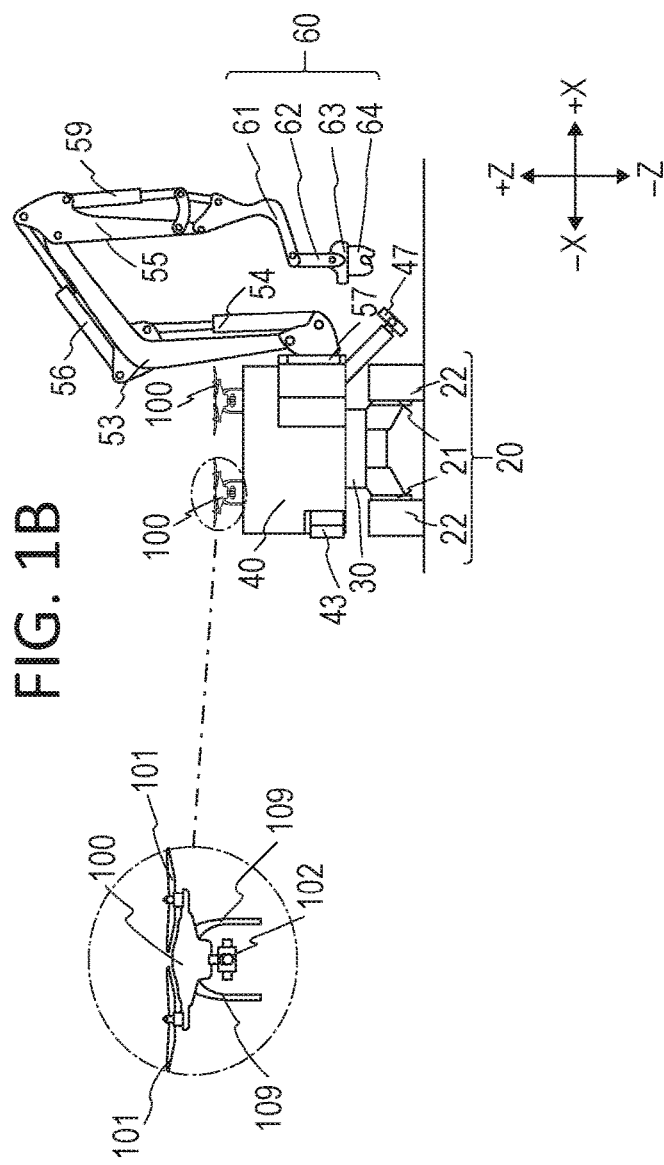
FIG. 1A
FIG. 1B

FIG. 4
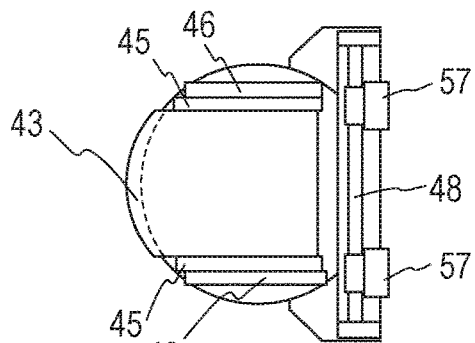
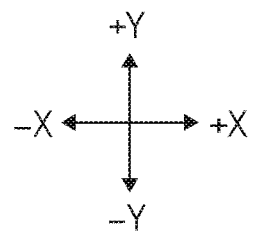
A—A ARROW VIEW
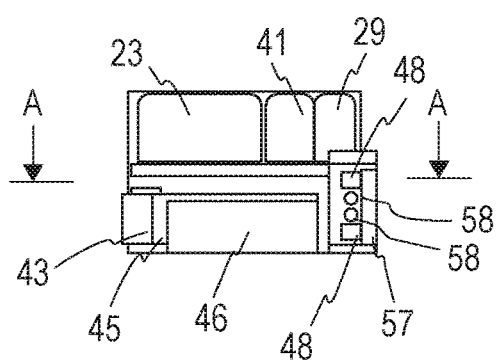
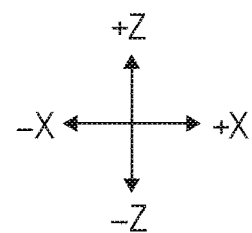
FIG. 5
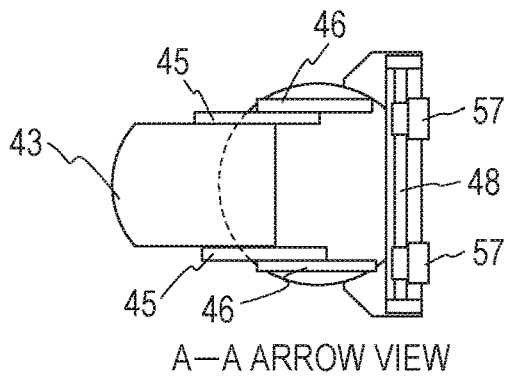
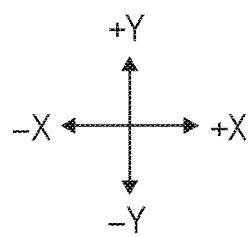
A—A ARROW VIEW
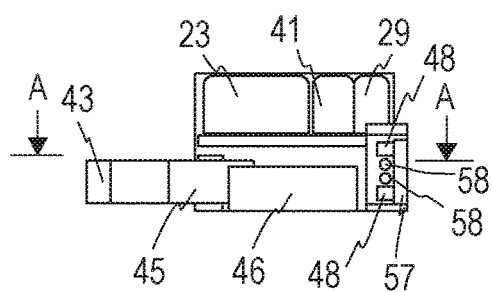
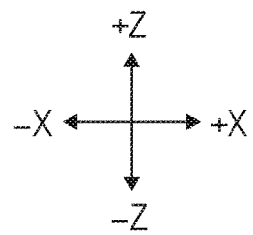

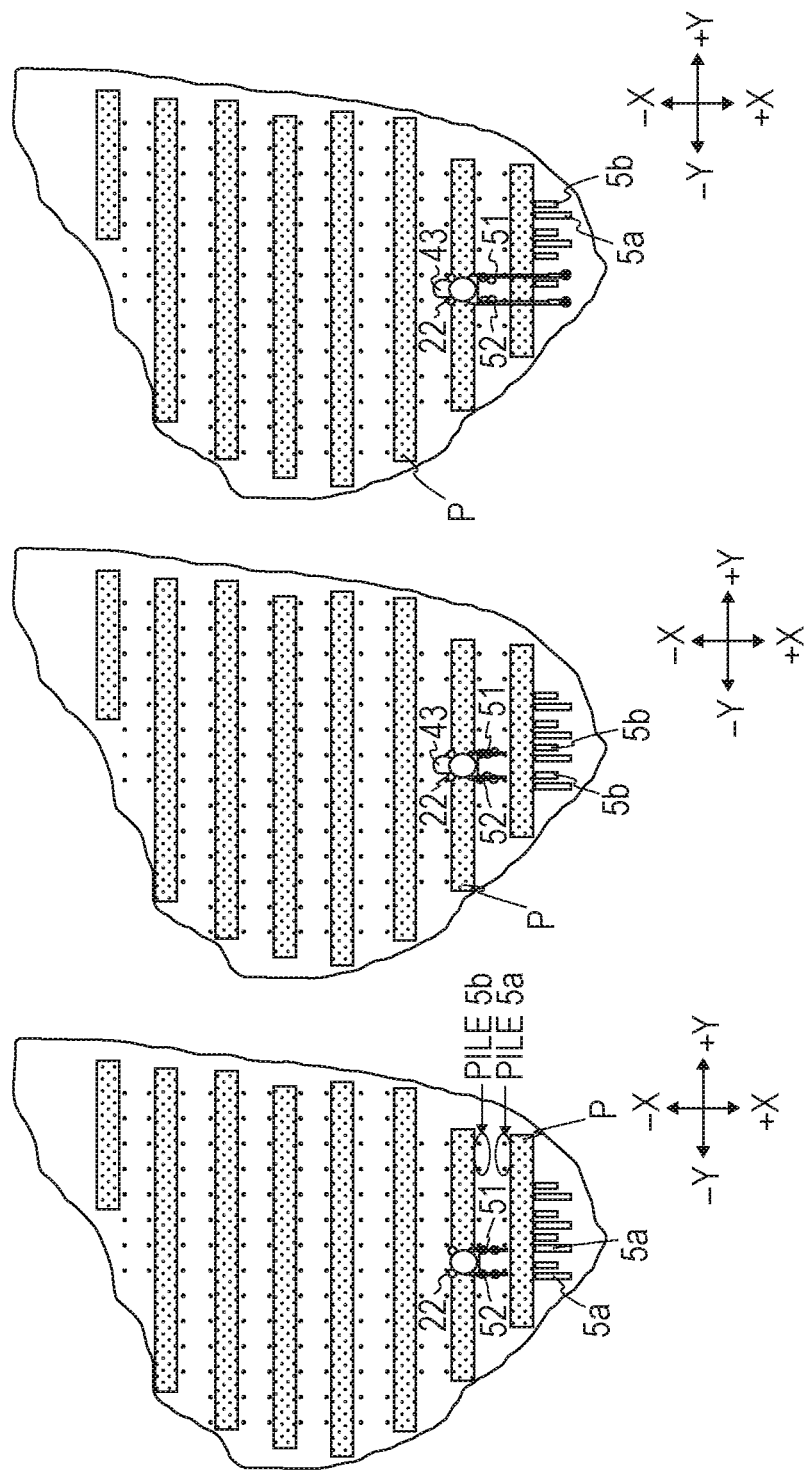

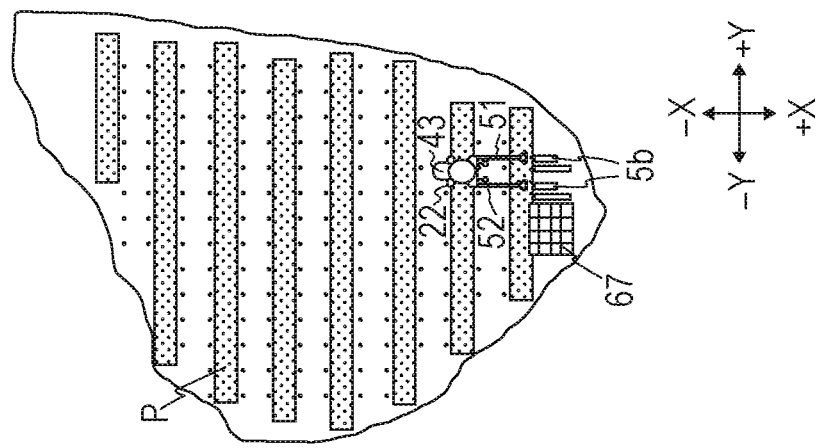
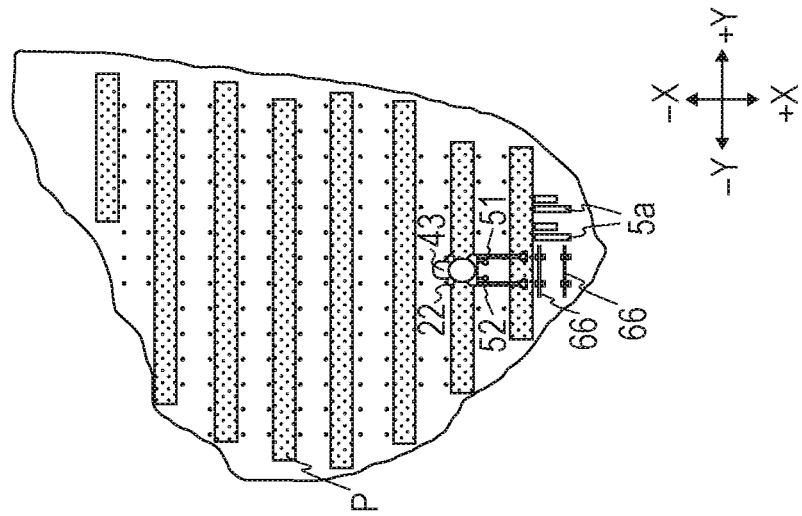
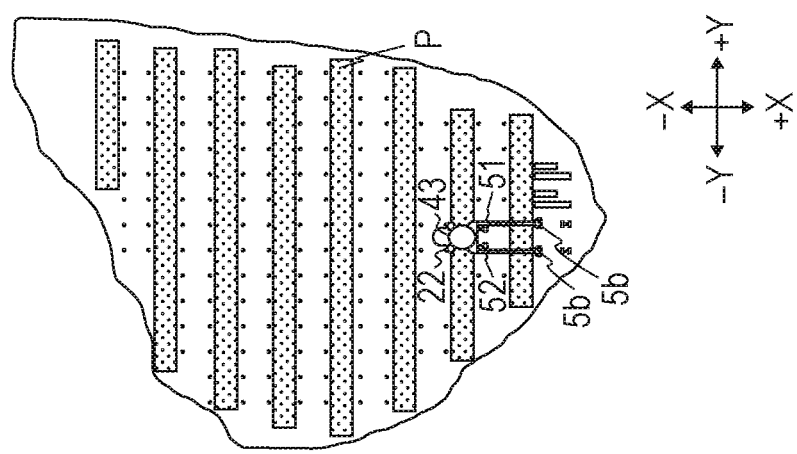

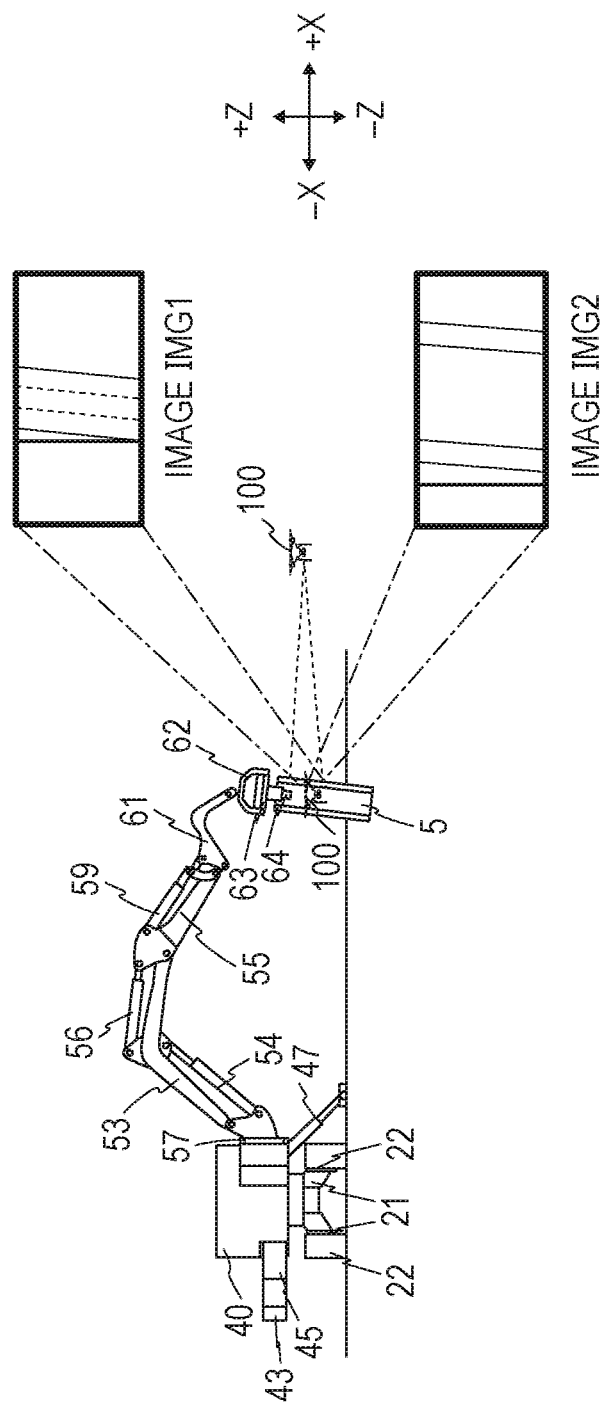

PILE DRIVING APPARATUS AND CONSTRUCTION MACHINE

TECHNICAL FIELD

The present invention relates to a pile driving apparatus and a construction machine, and particularly relates to a pile driving apparatus capable of simultaneously pile driving a plurality of piles and a construction machine capable of reducing greenhouse gases.

BACKGROUND

In related art, improvement of the efficiency of pile driving has been studied. JP Patent Publication No. JP 2015-113668 A discloses that four anchor piles having different pile driving directions are simultaneously pile driven obliquely at a prescribed angle in the ground.

SUMMARY

However, simultaneously pile driving a plurality of piles in the vertical direction has not been disclosed. In a construction site, a large number of piles, that is, several thousands to several tens of thousands of piles are sometimes driven, and efficient pile driving has been desired.

In addition, reduction of greenhouse gases is required worldwide, and construction machines that emit less greenhouse gases are also required for construction machines.

Therefore, an object of the first embodiment and the second embodiment of the invention is to provide a pile driving apparatus capable of simultaneously pile driving a plurality of piles.

In addition, an object of the present third embodiment of the invention is to provide a construction machine that emits less greenhouse gas.

A pile driving apparatus according to the first embodiment includes a main body (also called a main body device) that travels by a traveling device, a first pile driver that is connected to the main body and performs pile driving along a vertical direction, and a second pile driver that is connected to the main body and performs pile driving along the vertical direction.

A pile driving apparatus according to the second embodiment includes a main body that travels by a traveling device, a first pile driver that is connected to the main body and performs pile driving, a second pile driver that is connected to the main body and performs pile driving, and a conveyance unit that is connected to the main body and conveys a component to a pile that is pile driven.

A construction machine according to the third embodiment includes a main body that travels by a traveling device, a power generation device provided on an upper face of the main body, and a vibration power generation element provided in a vicinity of the traveling device.

According to the first embodiment and the second embodiment, because the first pile driver and the second pile driver are provided, it is possible to provide a pile driving apparatus capable of simultaneously pile driving a plurality of piles.

According to the third embodiment of the present invention, it is possible to provide a construction machine that emits less greenhouse gas by using a power generation device and a vibration power generation element.

BRIEF DESCRIPTION OF THE DRAWINGS

FIG. 1A is a top view of a schematic diagram when a pile driving system according to the first embodiment is at an initial position, and FIG. 1B is a front view thereof.

FIG. 4 is a cross-sectional view of the main body device when a work device is at an initial position.

FIG. 5 is a cross-sectional view of the main body device when the work device is at a work position.

FIG. 9A is a schematic view of a construction site illustrating a case where a work device is at an initial position, FIG. 9B is a schematic view of the construction site illustrating a case where a counter mass and a jack are at a work position, and FIG. 9C is a schematic view of the constructions site illustrating a state where the work device pile drives a pile.

FIG. 10A is a schematic view of a construction site illustrating a state in which a work device pile drives a pile, FIG. 10B is a schematic view of the construction site illustrating a state in which a component is attached to the pile, and FIG. 10C is a schematic view of the construction site illustrating a state in which the pile driving system moves to a next pile driving place.

FIG. 11 is a diagram illustrating a state in which images of a pile driven pile are captured by two drones.

DETAILED DESCRIPTION

Hereinafter, a pile driving system 1 according to the first embodiment of the present invention will be described in detail with reference to the accompanying drawings. Note that the present invention is not limited by the embodiments described below.

First Embodiment

Figure 2A:
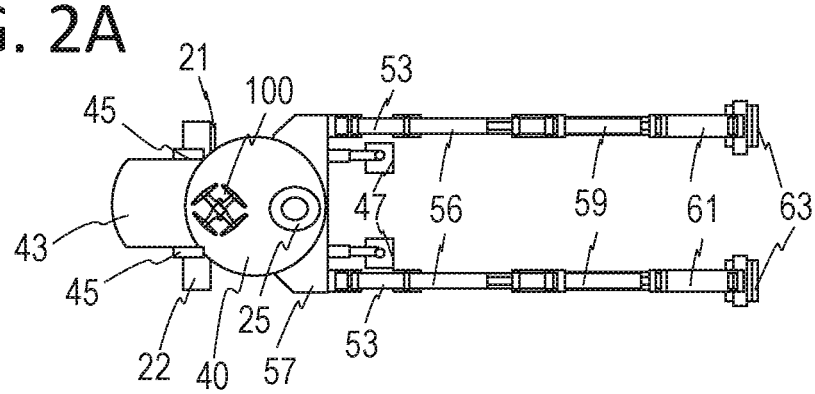
FIG. 2A is a top view of a schematic view illustrating an example when the pile driving system of the first embodiment is at a work position.
Figure 2B:
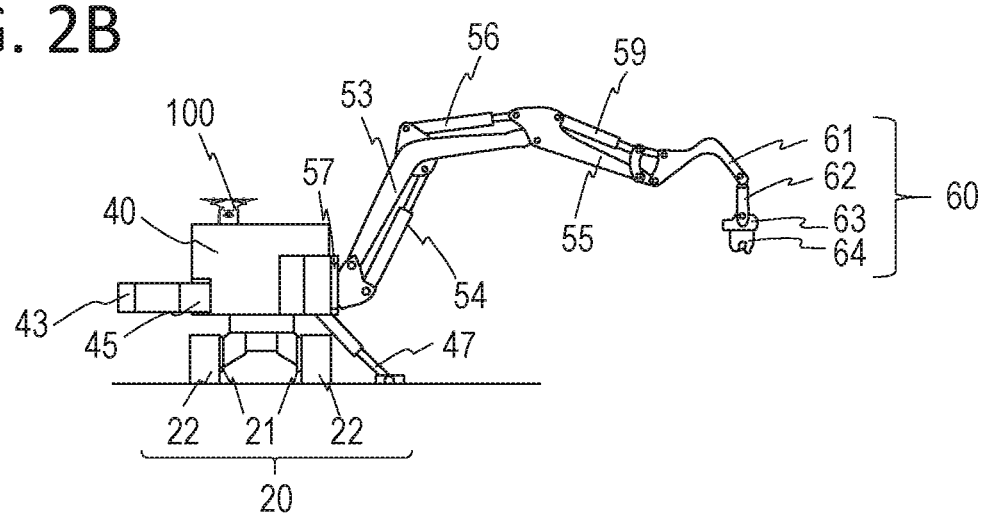
FIG. 2B is a front view thereof.
Figure 3:
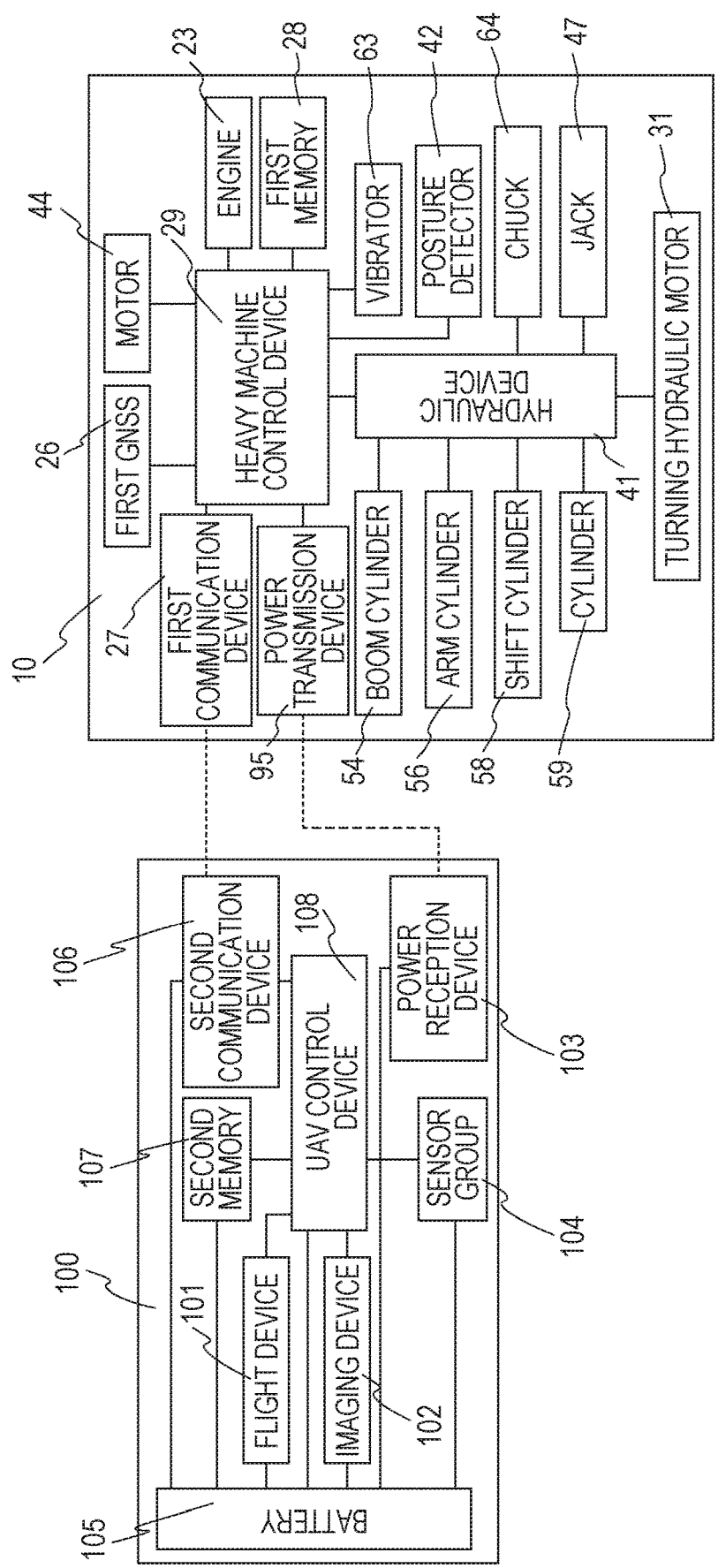
FIG. 3 is a block diagram of the pile driving system according to the first embodiment.

FIGS. 1A and 1B are schematic diagrams when a pile driving system 1 representing the present embodiment is at an initial position. FIG. 1A is a top view, and FIG. 1B is a front view. FIGS. 2A and 2B are schematic views illustrating an example when the pile driving system 1 representing the first embodiment is at a work position. FIG. 2A is a top view, and FIG. 2B is a front view. As illustrated in these figures, because the present embodiment is a double arm pile driving system 1, an unbalanced load easily acts in the +X direction in the drawing. In the present embodiment, a position where a work device 50 to be described later is less likely to generate an unbalanced load (that is, a position where there are few portions extending in the +X direction) is referred to as an initial position, and a position where the work device 50 extends in the +X direction by a series of pile driving operations of the work device 50 is referred to as a work position. FIG. 3 is a block diagram of the pile driving system 1 of the present embodiment. Hereinafter, the configuration of the pile driving system 1 will be described using FIGS. 1A to 3.

The pile driving system 1 of the present embodiment includes a base machine 10 (see FIG. 3), a plurality of pile driving attachments 60, and an unmanned aerial vehicle (UAV), hereinafter, referred to as a drone 100, which is an unmanned airplane or unmanned flight vehicle. To simplify the block diagram, FIG. 3 illustrates only a block diagram of one drone 100 and components of one work device 50. In addition, FIGS. 2A and 2B also illustrate only one drone 100 to illustrate the state of the take-off and landing portion.

Further, as is clear from FIGS. 1A through 2B, the base machine 10 of the present embodiment is an automated driving type without a driver seat. In the base machine 10, traveling at a construction site may be performed by automated driving, and the base machine 10 may be carried on a trailer on a public road. In addition, the operation of the base machine 10 may be an automatic operation or a remote operation at a remote place away from the pile driving place.

Base Machine 10

The base machine 10 of the present embodiment includes a traveling device 20, a turning device 30, and a main body device 40. In addition, the base machine 10 includes two drones 100 that can take-off and land from and on a take-off and landing portion provided on the upper face of the main body device 40. Note that the number of drones 100 may be one or three or more.

The traveling device 20 includes a pair of crawler belts 22, which is wound around an idler wheel (not illustrated) and a drive wheel 21, and drives the pair of crawler belts 22 by the drive wheels 21 to cause the base machine 10 to travel. An engine 23 (see FIG. 3) of the internal combustion engine constituting the traveling device 20 can be disposed in the main body device 40. Further, the traveling device 20 may be driven by a battery and a motor instead of the engine 23 of the internal combustion engine, or may be a hybrid type in which the engine 23 of the internal combustion engine and the motor are combined. Note that the traveling device 20 may be a tire type wheel system.

The turning device 30 is disposed between the traveling device 20 and the main body device 40. The turning device 30 includes a bearing (not illustrated) and a turning hydraulic motor 31, and turns the main body device 40 and the work device 50.

The main body device 40 has a flat upper face, and the side face to which two work devices 50 are connected. Inside the main body device 40, the engine 23 described above, a hydraulic device 41, a posture detector 42 (see FIG. 3), and an electric motor 44 (see FIG. 3) that moves a counter mass 43 described later are provided.

The hydraulic device 41 includes a hydraulic pump connected to the engine 23, a hydraulic control valve, and the like, and drives a plurality of cylinders as actuators provided in the work device 50.

The posture detector 42 (see FIG. 3) is a sensor that detects the posture of the main body device 40, and examples thereof include an inclinometer and a level. In the present embodiment, the posture detector 42 is provided inside the main body device 40, and detects the posture of the main body device 40 when the work device 50 and the two pile driving attachments 60 are driven.

FIG. 4 is a cross-sectional view of the main body device 40 when the work device 50 is at the initial position, and FIG. 5 is a cross-sectional view of the main body device 40 when the work device 50 is at the work position. Hereinafter, the counter mass 43, which is a mass body, will be described with reference to FIGS. 4 and 5.

The counter mass 43 is provided on the lower side of the main body device 40, and a pair of sliders 45 separated from each other in the Y direction is attached thereto. The pair of sliders 45 extends in the X direction and is movably supported in the X direction by the pair of base members 46. The counter mass 43 corrects an unbalanced load acting on the pile driving system 1 when the work device 50 moves. In the present embodiment, the weight of the counter mass 43 is about 4 tons to 7 tons, but the weight is not limited thereto. Part of the counter mass 43 may be a container, and the counter mass 43 may be configured by the container with which a liquid (for example, mercury) having a high specific gravity at normal temperature is filled. Although the electric motor 44 is used to drive the counter mass as described above, another type of actuator may be used. By moving the counter mass 43 in the −X direction, the weight of the counter mass 43 can be reduced as compared with a case where the counter mass 43 does not move in the −X direction.

The counter mass 43 is housed in the main body device 40 when the work device 50 is at the initial position, and moves in the −X direction in response to the movement of the work device 50 to the work position. In order to prevent an accident when the counter mass 43 having a weight of about 4 tons to 7 tons moves to the outside of the main body device 40, it is desirable to provide a warning lamp in the main body device 40 to call attention visually, or provide a speaker in the main body device 40 to call attention audibly, or both. In addition, prior to the movement of the counter mass 43, an imaging device 102 of the drone 100 may acquire an image of the surroundings where the counter mass 43 moves, and a UAV control device 108 or a heavy machine control device 29 may confirm safety. In addition, the imaging by the imaging device 102 of the drone 100 is preferably performed until the movement of the counter mass 43 is completed.

From the viewpoint of accident prevention, it is preferable to move the work device 50 to the work position after the counter mass 43 moves in the −X direction, but the movement of the counter mass 43 and the movement of the work device 50 to the work position may be performed substantially simultaneously.

The work device 50 includes a pair of jacks 47 between the two work devices 50. In the present embodiment, the pair of jacks 47 is a hydraulic jack, and is positioned in the +Z direction with respect to the pair of crawler belts 22 so as not to contact the ground when the work device 50 is at the initial position. In addition, the pair of jacks 47 extends so as to be in contact with the ground to support the pile driving system 1 when the work device 50 is at the work position. Although the unbalanced load acting on the pile driving system 1 is corrected by the counter mass 43 described above, because the construction site may be inclined, the pair of jacks 47 is used as the overturning prevention of the pile driving system 1. Note that the pair of jacks 47 may be not a pair but a single, or may be three or more, or may be omitted.

As illustrated in FIG. 2A, a take-off and landing portion for the drone 100 is formed on an upper face of the work device 50, and a visually recognized mark 25 is formed on the take-off and landing portion. The visually recognized mark 25 is for recognizing a landing position by visually recognizing one visually recognized mark 25 by an imaging device 102 to be described later when the drone 100 lands on the take-off and landing portion. Note that the size of the plurality of visually recognized marks 25 is smaller than the size of the drone 100, and in a case where one drone 100 lands on one visually recognized mark 25, this one visually recognized mark 25 is in a state of being invisible from the other drone 100. In addition, an interval between the plurality of visually recognized marks 25 is set so that the drones 100 do not interfere with each other when the plurality of drones 100 lands on the take-off and landing portion. Note that the shape of the visually recognized mark 25 is not limited to a circular shape, and may be a rectangular shape, an elliptical shape, a triangular shape, a double mark, or a single mark. Furthermore, the number of the visually recognized marks 25 may be one.

In the present embodiment, the main body device 40 includes a first global navigation satellite system (GNSS) 26 that is a global positioning system illustrated in FIG. 3, a first communication device 27, a first memory 28, and a heavy machine control device 29 that controls the entire base machine 10. The first GNSS 26 measures the position of the base machine 10 using an artificial satellite.

The first communication device 27 is a wireless communication unit that accesses a second communication device 106 described later and a wide area network such as the Internet. In the present embodiment, the first communication device 27 communicates the flight paths of the plurality of drones 100 to the second communication device 106 based on the position of the base machine 10 detected by the first GNSS 26.

The first memory 28 is a nonvolatile memory (for example, a flash memory), and stores various pieces of data and programs for driving the base machine 10 and various pieces of data and programs for automatically driving the base machine 10. In addition, the first memory 28 stores data regarding flight paths of the plurality of drones 100.

The heavy machine control device 29 is a control device that includes a CPU and controls the entire base machine 10. The control of the base machine 10 and the pile driving attachment 60 by the heavy machine control device 29 will be described later with reference to the flowchart of FIG. 7.

The work device 50 includes a first work device 51 and a second work device 52. As illustrated in FIGS. 1A and 1B, the first work device 51 and the second work device 52 extend from one side of the main body device 40 along the X direction and are separated from each other in the Y direction. In the present embodiment, the first work device 51 and the second work device 52 are connected to the main body device 40 to be parallel to the X direction. The number of the work devices 50 is not limited to two work devices, but may be three or more. In this case, the third work device 50 may be connected to a place other than the one side of the main body device 40. In the present embodiment, the base machine 10 and the two pile driving attachments 60 constitute the first pile driver and the second pile driver.

In the present embodiment, because the first work device 51 and the second work device 52 have the same configuration, the configuration of the first work device 51 will be described. In addition, the configurations and reference numerals of the first work device 51 and the second work device 52 are the same, but in a case where identification is required, each configuration of the first work device 51 is denoted by a after the reference numeral, and each configuration of the second work device 52 is denoted by b after the reference numeral. The first work device 51 includes a boom 53, a boom cylinder 54, an arm 55, an arm cylinder 56, and a boom attachment base 57.

The boom 53 is a rotary L-shaped component connected to the main body device 40 via the boom attachment base 57, and is rotated by the boom cylinder 54. The boom 53 is at the initial position in FIGS. 1A and 1B when the boom cylinder 54 is maximally extended, and is at the work position in FIGS. 2A and 2B when the boom cylinder 54 is shortened.

The arm 55 is connected to the distal end of the boom 53 and is rotated by the arm cylinder 56. The arm 55 is at the initial position in FIGS. 1A and 1B when the arm cylinder 56 is maximally extended, and is at the work position in FIGS. 2A and 2B when the arm cylinder 56 is shortened.

A shift cylinder 58 is a cylinder that adjusts the interval between the first work device 51 and the second work device 52 in the Y direction according to the interval between two pile drivings. As illustrated in FIGS. 4 and 5, the shift cylinder 58 adjusts the distance in the Y direction between the first work device 51 and the second work device 52 using a pair of guides 48 separated in the Z direction as guides. In this case, the shift cylinder 58 may slide the second work device 52 in the Y direction (e.g., the traveling direction) while fixing the first work device 51. Alternatively, the shift cylinder 58 may slide the first work device 51 and the second work device 52 in the Y direction.

A cylinder 59 rotates the pile driving attachment 60. The cylinder 59 is at the initial position in FIGS. 1A and 1B when the cylinder 59 is maximally extended, and the cylinder 59 is at the work position in FIGS. 2A and 2B when the cylinder 59 is shortened.

In the present embodiment, the boom cylinder 54, the arm cylinder 56, the shift cylinder 58, and the cylinder 59 are hydraulic cylinders, and each extends and contracts by hydraulic pressure. In addition, the boom cylinder 54, the arm cylinder 56, the shift cylinder 58, the cylinder 59, and a vibrator 63 to be described later are extended and contracted by the hydraulic device 41.

One end (−Z side) of the pile driving attachment 60 is connected to the arm 55 and the cylinder 59, and the other end (+Z side) is provided with an attachment/detachment mechanism for attaching a pile 5 (see FIGS. 6A and 6B) to be pile driven or removing the pile driven pile 5. The pile driving attachment 60 includes an attachment arm 61, a hanger 62, a vibrator 63, and a chuck 64.

The attachment arm 61 is a rotating L-shaped component, and one end (−Z side) thereof is connected to the arm 55 and the cylinder 59.

The hanger 62 is suspended from the other end of the attachment arm 61 and is rotatable about the Z axis.

The vibrator 63 is suspended from the hanger 62 and generates vibration using hydraulic pressure as energy. The pile driving of the present embodiment is performed using the vibration of the vibrator 63. The vibrator 63 may be a pendulum type or a piston type.

The chuck 64 is attached to a lower end portion of the vibrator 63 and detachably grips the pile 5. In addition, the chuck 64 transmits vibration from the vibrator 63 to the pile 5 when the pile 5 is gripped.

Figure 6A:
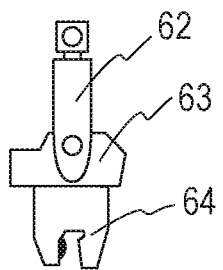
FIG. 6A is a view illustrating a state in which a chuck is open.
Figure 6B:
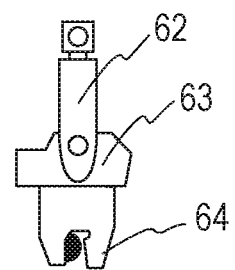
FIG. 6B is a view illustrating a state in which the chuck is closed.

FIGS. 6A and 6B are views illustrating an open/close state of the chuck 64. FIG. 6A is a view illustrating a state in which the chuck 64 is open, and FIG. 6B is a view illustrating a state in which the chuck 64 is closed. The opening and closing of the chuck 64 are also extended and contracted by the hydraulic device 41.

Returning to FIG. 3, a power transmission device 95 supplies power to a power reception device 103 to be described later for the drone 100. A wireless power supply is used in the present embodiment. The wireless power supply supplies power to the power reception device 103 in a non-contact manner, and a magnetic field resonance system, an electromagnetic induction system, and the like are known. The power transmission device 95 of the present embodiment includes a power supply (or power supply unit), a control circuit, and a power transmission coil. The power transmission coil is preferably provided in the take-off and landing portion. In this case, when the power transmission coil is provided inside the visually recognized mark 25, charging can be promptly started when the drone 100 lands.

Note that a contact-type power supply method may be used instead of wireless power supply. In this case, a metal contact may be provided in each of the power transmission device 95 and the power reception device 103, and power may be supplied by mechanically connecting the contact points. For example, a concave contact may be provided on the take-off and landing portion, and a convex contact may be provided on the drone 100. The number of concave contacts and convex contacts may each be one, and may each be plural.

In a case where the base machine 10 moves on a construction site with unevenness in a state where the drone 100 lands on the take-off and landing portion, it is desirable to mechanically engage or electromagnetically connect the drone 100 and the take-off and landing portion so that the drone 100 does not move away from the take-off and landing portion. In the present embodiment, a lock mechanism that applies a mechanical lock when the drone 100 lands on the take-off and landing portion is used.

The drone 100 of the present embodiment includes a flight device 101, an imaging unit or imaging device 102, a power reception device 103, a sensor group 104, a battery 105, a second communication device 106, a second memory 107, and a UAV control device 108.

The flight device 101 includes a motor (not illustrated) and a plurality of propellers, and generates thrust for floating the drone 100 in the air and moving in the air. Note that the number of drones landing on the take-off and landing portion is two in FIGS. 1A and 1B, but can be any number, and the number is not limited to two. In addition, the configurations of the respective drones 100 may be the same, or part thereof may be changed. Furthermore, the sizes of the respective drones 100 may be the same or different.

The imaging device 102 is a digital camera that includes a lens, an imaging element, an image processing engine, and the like and captures a moving image and a still image. In the present embodiment, the imaging device 102 conducts a survey and performs imaging for supporting pile driving. In addition, the imaging device 102 visually recognizes one visually recognized mark 25 when the drone 100 lands on the take-off and landing portion to recognize the landing position. Note that when a power transmission coil or a contact of the power transmission device 95 is provided in the visually recognized mark 25, it is possible to quickly charge the battery 105 via the power reception device 103 after the drone 100 lands on the take-off and landing portion. Note that the imaging device 102 is preferably provided with a biaxial or triaxial gimbal to perform aerial imaging without blurring. Note that prevention of blurring of the imaging device may be performed by software.

In the enlarged view surrounded by the alternate long and short dash line in FIG. 1B, the lens of the imaging device 102 is attached to the side face (front face) of the drone 100, but the lens of the imaging device 102 may be attached to the lower face of the drone 100, or a plurality of lenses may be provided in the drone 100. Further, a movement mechanism for moving the lens attached to the side face toward the lower face may be provided. Furthermore, a mechanism for rotating the imaging device 102 about the Z axis may be provided to position the lens of the imaging device 102 at any position about the Z axis. In addition, when the drone 100 lands on the take-off and landing portion, in a case where the lens of the imaging device 102 is directed in the X direction or the Y direction, it is possible to capture images close to images visually recognized by the operator from the driver seat of the conventional base machine from a plurality of directions. In addition, because the take-off and landing portion is provided at the top of the main body device 40 as apparent from FIG. 1B, for example, the drone 100 can perform imaging by the imaging device 102 without being blocked by the main body device 40. Note that an omnidirectional camera (360-degree camera) may be used as the imaging device 102, or a three-dimensional scanner may be used instead of the imaging device 102.

The power reception device 103 includes a power reception coil, a charging circuit, and the like provided in the leg portion 109 of the drone 100, and charges the battery 105 with power from the power transmission device 95.

The battery 105 is a secondary battery connected to the power reception device 103, and an example thereof may include a lithium ion secondary battery, a lithium polymer secondary battery, or the like, but is not limited thereto. The battery 105 can supply power to the flight device 101, the imaging device 102, the second communication device 106, the second memory 107, and the UAV control device 108.

Examples of the sensor group 104 include a GNSS, an infrared sensor that avoids collision between the drone 100 and another device (for example, the work device 50), an atmospheric pressure sensor that measures altitude, a magnetic sensor that detects orientation, a gyro sensor that detects the posture of the drone 100, an acceleration sensor that detects acceleration acting on the drone 100, or the like.

The second communication device 106 includes a wireless communication unit and communicates with the first communication device 27. In the present embodiment, the second communication device 106 transmits image data captured by the imaging device 102 and a detection result detected by the sensor group 104 to the first communication device 27 and transmits a flight command from the first communication device 27 to the UAV control device 108.

The second memory 107 is a nonvolatile memory (for example, a flash memory), and stores various pieces of data and programs for flying the drone 100 and stores image data captured by the imaging device 102, a detection result detected by the sensor group 104, and the like.

The UAV control device 108 includes a CPU, a posture control circuit, a flight control circuit, and the like, and controls the entire drone 100. Furthermore, the UAV control device 108 determines the timing of charging from the remaining amount of the battery 105, and controls the imaging position, the angle of view, the frame rate, and the like of the imaging device 102.

Examples of the pile 5 (see FIGS. 8A through 8F) may include an H-shaped steel, an L-shaped steel, an angle-shaped steel, a grooved steel, a round steel, or the like. In the present embodiment, an H-shaped steel is used. The H-shaped steel pile 5 is composed of an upper flange, a lower flange, and a web sandwiched between the upper flange and the lower flange. It is assumed that the H-shaped steel pile 5 is placed on a construction site so that an end face of the upper flange and an end face of the lower flange are in contact with the ground. The operation of the pile driving system 1 configured as described above will be described below.

Description of Flowchart

Figure 7:
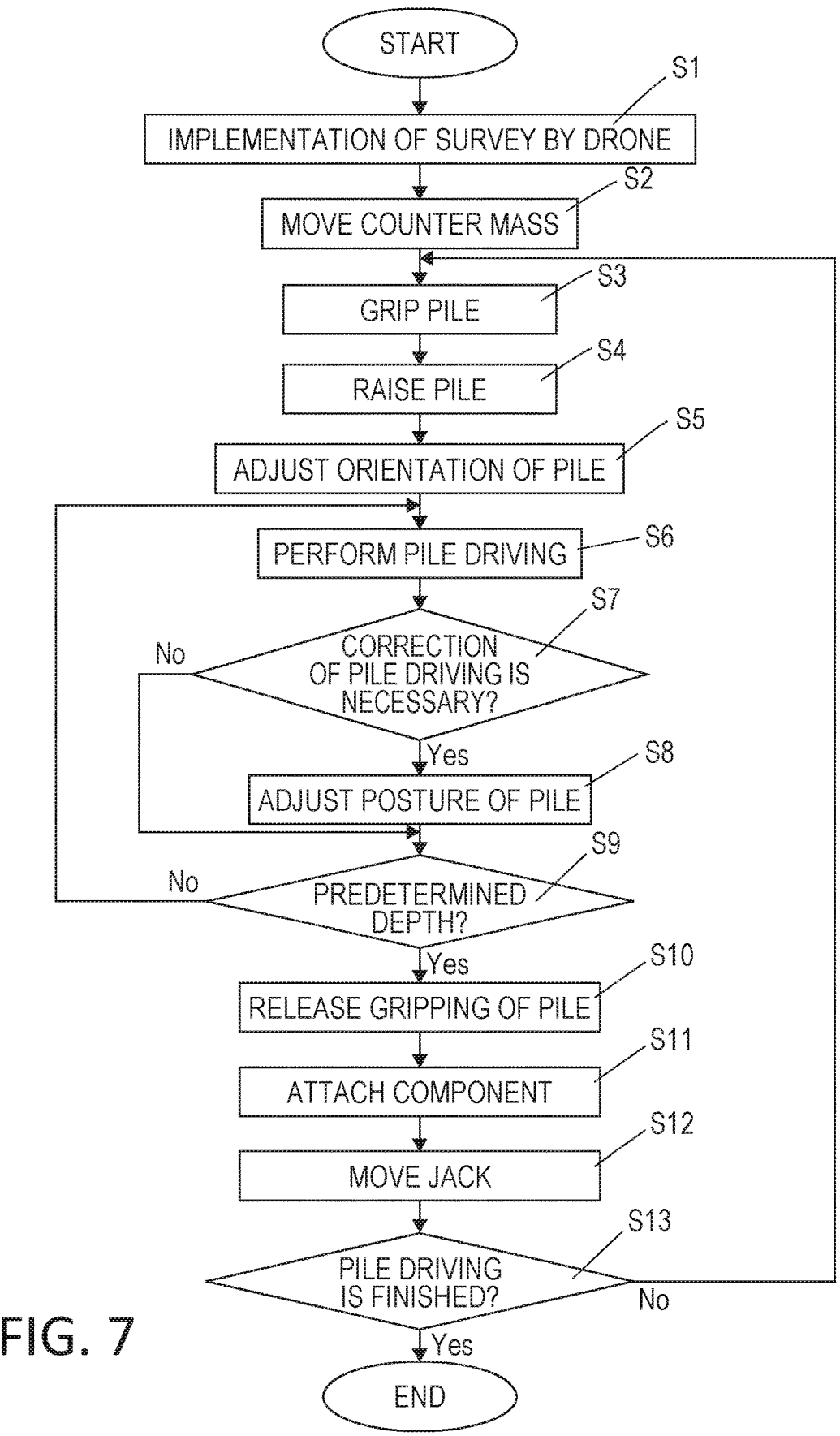
FIG. 7 is a flowchart related to pile driving performed by a heavy machine control device according to the first embodiment.
Figure 8A:
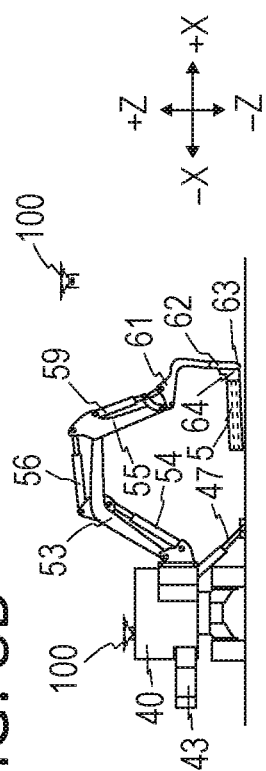
FIG. 8A is a view illustrating movement of a counter mass during an operation of pile driving.
Figure 8B:
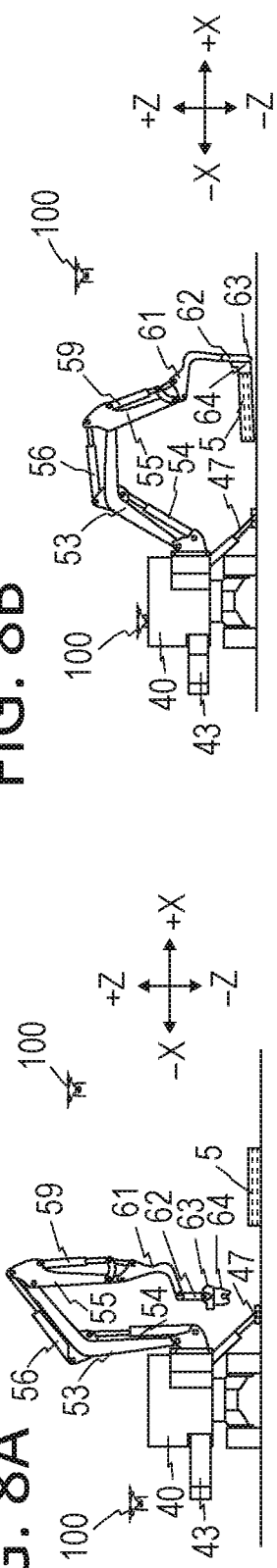
FIG. 8B is a view illustrating a state of gripping a pile during the operation of pile driving.
Figure 8C:
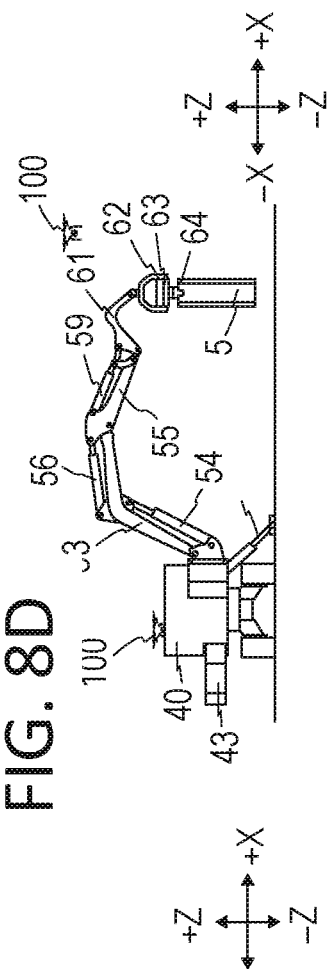
FIG. 8C is a view illustrating a state of raising the pile during the operation of pile driving.
Figure 8D:
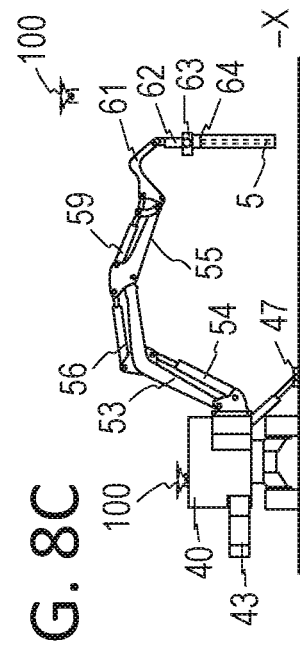
FIG. 8D is a view illustrating a state in which a direction of the pile is changed during the operation of pile driving.
Figure 8E:
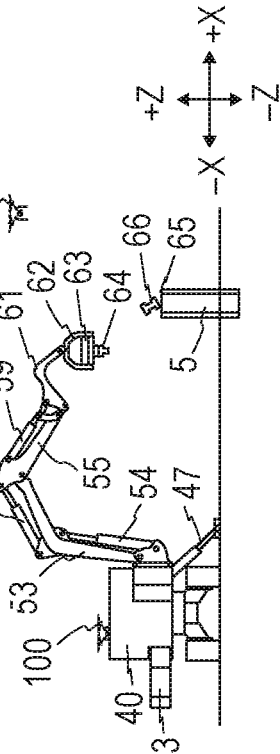
FIG. 8E is a view illustrating a state of pile driving the pile during the operation of pile driving.
Figure 8F:
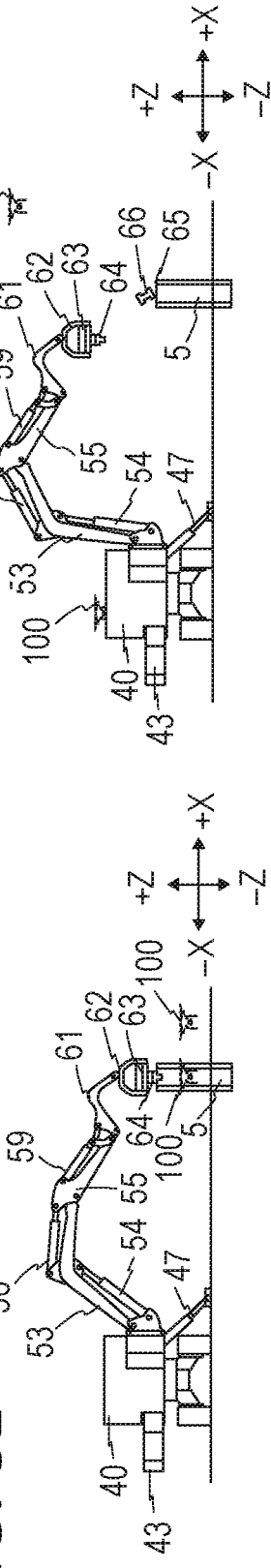
FIG. 8F is a view illustrating a state in which a component is attached to the pile after the pile driving.

FIG. 7 is a flowchart of pile driving performed by the heavy machine control device 29 according to the present embodiment. FIGS. 8A-8F are diagrams illustrating an operation of pile driving. Specifically, FIG. 8A is a diagram illustrating movement of the counter mass 43, FIG. 8B is a diagram illustrating a state of gripping the pile 5, FIG. 8C is a diagram illustrating a state of raising the pile 5, FIG. 8D is a diagram illustrating a state of changing the orientation of the pile 5, FIG. 8E is a diagram illustrating a state of pile driving the pile 5, and FIG. 8F is a diagram illustrating a state in which a component is attached to the pile 5 after the pile driving.

FIGS. 9A through 9C are schematic views of the construction site according to the present embodiment. FIG. 9A is a view illustrating a case where the work device 50 is at an initial position, FIG. 9B is a view illustrating a case where the counter mass 43 and the jack 47 (e.g., a stabilizing member) are at a work position, and FIG. 9C is a view illustrating a state where the work device 50 drives the pile 5.

In addition, FIGS. 10A through 10C are schematic diagrams of the construction site according to the present embodiment. FIG. 10A is a diagram illustrating a state in which the work device 50 drives the pile 5, FIG. 10B is a diagram illustrating a state in which a component is attached to the pile 5, and FIG. 10C is a diagram illustrating a state in which the pile driving system 1 moves to the next pile driving place. Note that, to avoid complication of the drawings, only components necessary for description are denoted by reference numerals in FIGS. 8A to 10C, and illustration of the drone 100 is omitted in FIGS. 9A to 10C.

Hereinafter, the flowchart of FIG. 7 will be described with reference to FIGS. 8A to 10C.

In the flowchart of FIG. 7, part thereof may be performed by an operator.

Before starting pile driving, the heavy machine control device 29 acquires point group data from images as a survey by the imaging devices 102 of the two drones 100 (step S1). Note that, at the time of conducting a survey, the lens of the imaging device 102 faces the lower face (−Z direction). By conducting a survey by two drones 100, the survey time can be shortened as compared with a case that conducts a survey by one drone 100.

Note that a survey may be conducted by three or more drones 100. Note that because it takes considerable time before performing step S2 after conducting a survey in step S1, step S1 may be excluded from this flowchart. Step S1 may instead be the preparation work of this flowchart.

Based on the survey in step S1 and the data of the positions at which the piles 5 are to be pile driven, a plurality of piles 5 is placed laterally on the construction site. At this time, the plurality of piles 5 is laterally placed on the construction site while avoiding a traveling path P on which the pile driving system 1 travels. The horizontal placement of the plurality of piles 5 may be performed by a conveyance robot (not illustrated) or may be performed by an operator. Note that a plurality of points in FIGS. 9A through 10C virtually indicate positions where pile driving is to be performed.

In the present embodiment, a solar panel 67 (see FIG. 10C) is inclined with respect to the four piles 5. Therefore, as indicated by arrows in FIG. 9A, of the four points to be pile driven, long piles 5a are pile driven at two points on the +X side and short piles 5b are pile driven at two points on the −X side. An angle adjustment member 65 described later is used to adjust the inclination of the solar panel 67.

With the pile driving attachment 60 attached to each of the first work device 51 and the second work device 52, each of the first work device 51 and the second work device 52 is extended to the +X side to perform pile driving of two long piles 5a as illustrated in FIG. 9C. Then, each of the first work device 51 and the second work device 52 is shortened to the −X side to perform pile driving of two short piles 5b as illustrated in FIG. 10A. The number of the piles 5 supporting the solar panel 67 may be two, three, or one.

In the present embodiment, when the pile driving of the four piles 5 is completed, the heavy machine control device 29 moves the pile driving system 1 in the Y direction by the traveling device 20. The pile driving system 1 drives the first work device 51 and the second work device 52 in the movement in the X direction, and drives the traveling device 20 in the movement in the Y direction. To quickly move in the X direction and the Y direction, at the initial position and the work position, the traveling device 20 is positioned so that the pair of crawler belts 22 is directed along the Y direction, and the first work device 51 and the second work device 52 are positioned along the X direction.

The heavy machine control device 29 moves the counter mass 43 in the −X direction along the pair of base members 46 by the electric motor 44 (step S2). As illustrated in FIG. 8A, the heavy machine control device 29 images the periphery of the counter mass 43 by the imaging device 102 of the other drone 100. In addition, the heavy machine control device 29 desirably makes notification of movement of the counter mass 43 using a warning light, a speaker, or the like before the movement of the counter mass 43. In addition, the heavy machine control device 29 moves the pair of jacks 47 at the initial position to the work position, and implements the overturning prevention measure for the pile driving system 1 by the pair of jacks 47. FIG. 9B illustrates a state in which step S2 is completed.

The heavy machine control device 29 causes the first work device 51 and the second work device 52 to approach the respective two piles 5 to be pile driven, and causes the two pile driving attachments 60 to grip the web portions of the two piles 5 from a state in which each chuck 64 is opened to a state in which each is closed (step S3). FIG. 8B is a diagram illustrating a state of work in step S3, and the other drone 100 that has finished imaging the periphery of the counter mass 43 is charged at the take-off and landing portion. Note that, in addition to one drone 100, the other drone 100 may capture an image of the periphery of the first work device 51 and the second work device 52 or the periphery of the two pile driving attachments 60.

The heavy machine control device 29 controls each of the first work device 51 and the second work device 52 to raise each of the two piles 5 (step S4). FIG. 8C illustrates a state of the pile 5 raised in step S4.

As illustrated in FIG. 8D, the heavy machine control device 29 adjusts the orientation of the pile 5 so that the web of the H-shaped steel pile 5 is along the X direction (so that the upper flange and the lower flange are orthogonal to the paper) (step S5). The orientation of the pile 5 may be adjusted by a rotation motor (not illustrated) provided in the pile driving attachment 60, or the orientation may be adjusted by an operator. After step S5, to pile drive the two piles 5 almost simultaneously, the heavy machine control device 29 drives the shift cylinder 58 to adjust in advance the interval in the Y direction between the first work device 51 and the second work device 52 based on the interval between the two piles.

As illustrated in FIGS. 8E and 9C, the heavy machine control device 29 performs pile driving while applying vibration to the respective H-shaped steel piles 5 by the two vibrators 63 (step S6). In addition, the heavy machine control device 29 determines whether it is necessary to correct the pile driving during the pile driving in step S6 (step S7).

FIG. 11 is a diagram illustrating a state in which an image of the pile driven pile 5 is captured by two drones 100. As illustrated in FIG. 11, the heavy machine control device 29 causes two drones 100 to fly. The heavy machine control device 29 causes the imaging device 102 of one of the drones 100 to perform imaging from the X direction to acquire an image IMG1 illustrated in the upper square frame of FIG. 11. In addition, the heavy machine control device 29 causes the imaging device 102 of the other drone 100 to perform imaging from the Y direction orthogonal to the X direction and the Z direction to acquire an image IMG2 illustrated in the lower square frame of FIG. 11. In the image IMG1 and the image IMG2, a thick line extending in the Z direction in a square frame represents a reference image (e.g., from a recording unit that records the reference image). The heavy machine control device 29 compares the reference image with the acquired image to determine whether the correction of the pile driving is necessary.

Here, the heavy machine control device 29 determines that it is necessary to correct the pile driving, and proceeds to step S8. The heavy machine control device 29 continues the pile driving operation while adjusting the position of the pile 5 by appropriately controlling the boom cylinder 54, the arm cylinder 56, the shift cylinder 58, and the cylinder 59, acquires images by the imaging devices 102 of the two drones 100, compares the acquired images with the reference image, and adjusts the posture of the pile 5 (step S8).

In FIG. 11, because the posture of one pile 5 is imaged by two drones 100, four drones 100 are required in a case where two piles 5 are almost simultaneously pile driven.

Figure 12:
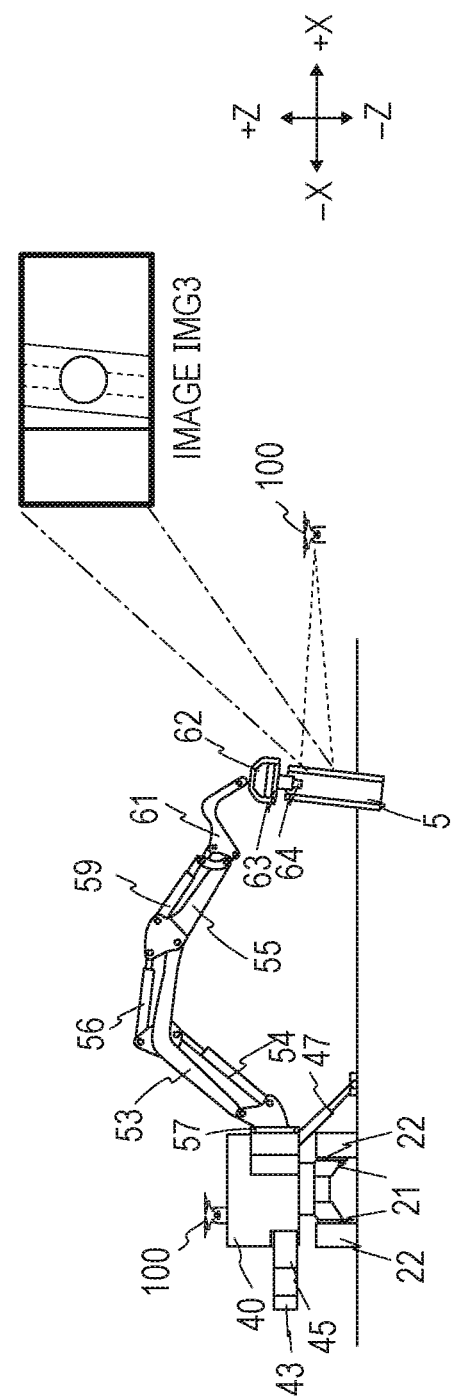
FIG. 12 is a diagram illustrating a state in which a pile driven pile is imaged by one drone.

FIG. 12 is a diagram illustrating a state in which an image of the pile driven pile 5 is captured by one drone. In FIG. 12, a circular mark is formed on a flange (for example, an upper flange) of the pile 5. The image captured by the imaging device 102 of one drone includes an image of the lower flange indicating a tilt in the Y direction and an image of the circular mark indicating a tilt in the X direction. In a case where there is no tilt in the X direction, the image captured by the imaging device 102 of the drone is circular, but in a case where there is a tilt in the X direction, the image captured by the imaging device 102 of the drone is elliptical. Although the reference image extending in the Z direction is displayed in the image IMG3, a circular reference image may be displayed in addition to the reference image.

Figure 13A:
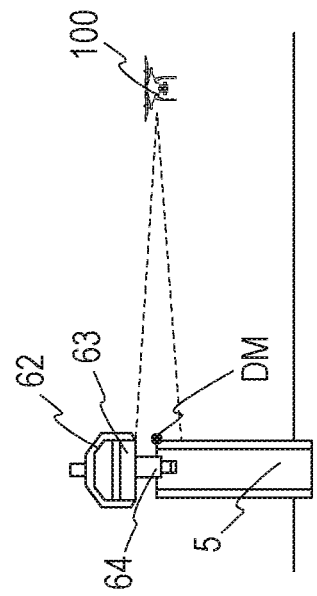
FIG. 13A is a diagram illustrating an example in which a pile driving depth mark DM is provided in a lower portion of a pile.
Figure 13B:
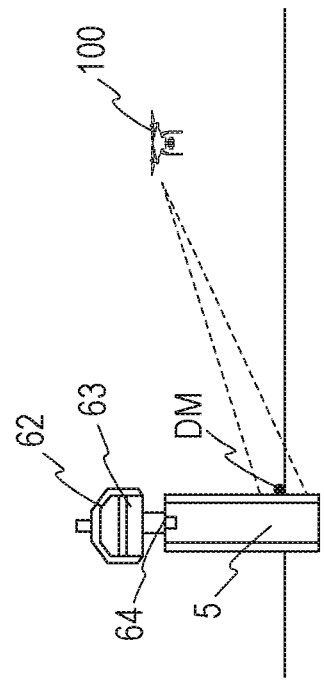
FIG. 13B is a diagram illustrating an example in which the pile driving depth mark DM is provided in an upper portion of the pile.

The heavy machine control device 29 determines whether each pile 5 is pile driven to a predetermined depth (step S9). FIGS. 13A and 13B are diagrams illustrating a pile driving depth mark DM formed on the upper flange of the pile 5. FIG. 13A is a diagram illustrating an example in which the pile driving depth mark DM is provided in the lower portion of the pile 5, and FIG. 13B is a diagram illustrating an example in which the pile driving depth mark DM is provided in the upper portion of the pile 5. Note that an example of the depth mark DM is a horizontal line.

As illustrated in FIG. 13A, when the ground surface substantially matches the horizontal line forming the pile driving depth mark DM from the image captured by the imaging device 102 of the drone 100 from obliquely above the pile 5, the heavy machine control device 29 determines that the pile 5 has been pile driven to a predetermined depth and proceeds to step S10. On the other hand, when the horizontal line forming the pile driving depth mark DM is located above the ground surface, the heavy machine control device 29 determines that pile driving has not been performed to a predetermined depth and repeats step S6 and subsequent steps.

In addition, the heavy machine control device 29 sets the altitude of the drone 100 based on the survey result in step S1 and the height information about the pile driving depth mark DM formed on the upper portion of the pile 5. This is because the position of the pile driving depth mark DM is detected based on the altitude of the drone 100. The UAV control device 108 controls the altitude of the drone 100 based on the output of the atmospheric pressure sensor so that the altitude is the set altitude. When the drone 100 reaches the altitude, the UAV control device 108 causes the imaging device 102 to image the pile driving depth mark DM. As illustrated in FIG. 13B, when the pile driving depth mark DM is located at a predetermined height from the ground surface from the image captured by the imaging device 102, the heavy machine control device 29 determines that the pile 5 has been pile driven to a predetermined depth and proceeds to step S10. On the other hand, when the pile driving depth mark DM is higher than the predetermined height from the ground surface, the heavy machine control device 29 determines that the pile driving has not been performed to the predetermined depth, and repeats step S6 and the subsequent steps.

When determining in step S9 that each of the piles 5 has been pile driven to a predetermined depth, the heavy machine control device 29 releases the gripping of the web of the pile 5 from the closed state to the open state of the chuck 64 (step S10).

The heavy machine control device 29 attaches the angle adjustment member 65 and a lateral beam member 66 to each of the two piles 5 that have been pile driven (step S11). The angle adjustment member 65 is a mechanical component that adjusts the degree of inclination of the solar panel 67. The lateral beam member 66 is a mechanical component to which the solar panel 67 is attached. The angle adjustment member 65 and the lateral beam member 66 may be attached by an assembly robot (not illustrated) or by an operator.

Before the movement, the heavy machine control device 29 moves the pair of jacks 47 from the work position to the initial position (step S12). In this case, because the two pile driving attachments 60 do not grip the pile 5, the possibility of overturning is extremely low, but the heavy machine control device 29 may move part of the first work device 51 and the second work device 52 in the −X direction.

The heavy machine control device 29 determines whether the planned pile driving is finished (step S13). When the planned pile driving is not finished (step S13/NO), the heavy machine control device 29 moves to the next pile driving place and repeats the processing of step S3 and subsequent steps until the planned pile driving is finished. On the other hand, when the planned pile driving is finished (step S13/YES), the heavy machine control device 29 ends this flowchart. When ending this flowchart, the heavy machine control device 29 returns the pile driving system 1 to the initial position and houses the counter mass 43 in the main body device 40. Then, the heavy machine control device 29 moves the pile driving system 1 to a predetermined place.

Note that, during the execution of this flowchart, the heavy machine control device 29 may monitor the output of the posture detector 42. The heavy machine control device 29 may interrupt the pile driving operation and return the pile driving system 1 to the initial position in a case where the main body device 40 inclines to a predetermined level or more due to the influence of wind, looseness of the ground surface, or the like. In this case, the heavy machine control device 29 may keep the counter mass 43 positioned outside the main body device 40, or may house the counter mass 43 in the main body device 40 according to the output of the posture detector 42.

Modification

Figure 14:
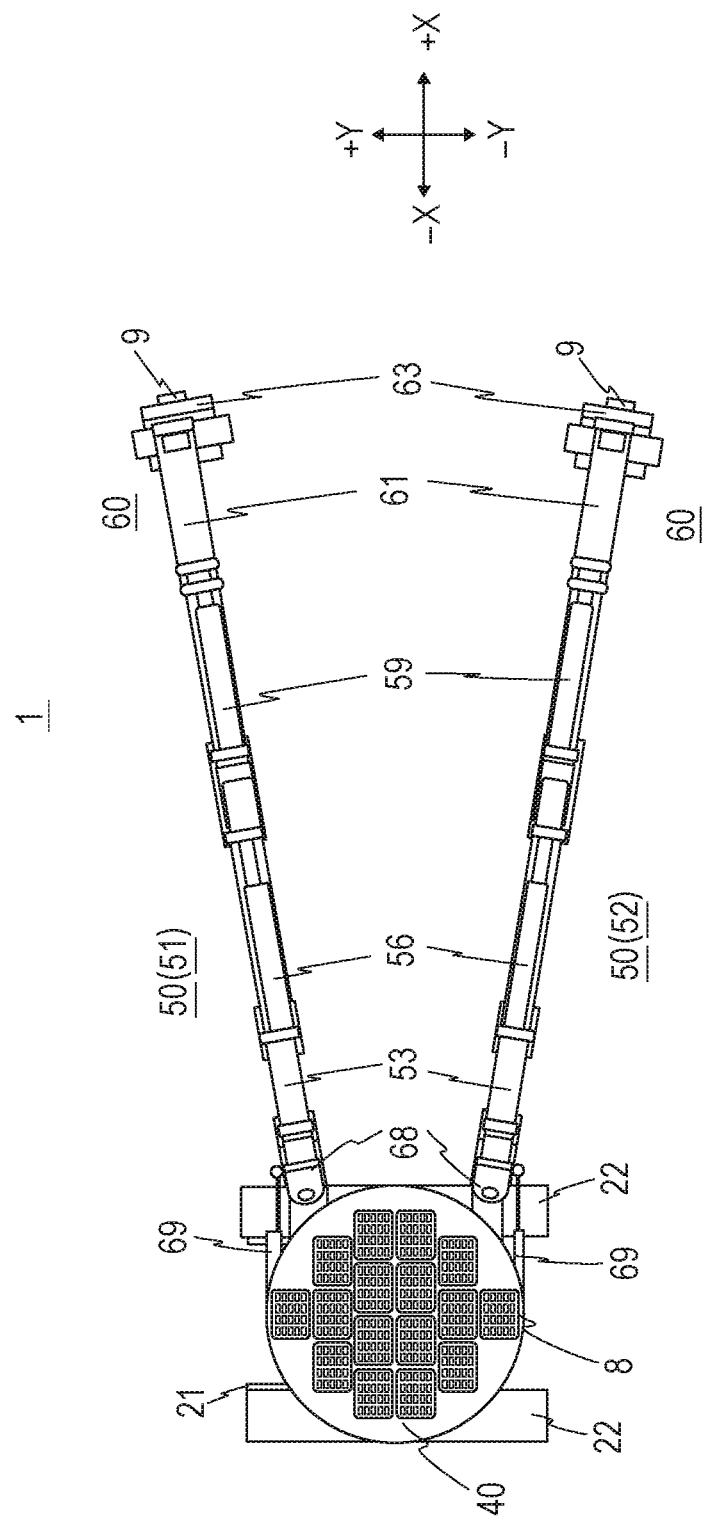
FIG. 14 is a schematic diagram illustrating a modification of the pile driving system according to the first embodiment.

FIG. 14 is a schematic diagram illustrating a modification of the pile driving system 1 of the first embodiment. In the first embodiment, the first work device 51 and the second work device 52 are connected to the main body device 40 so as to be parallel to the X direction. In the present modification, the first work device 51 and the second work device 52 are connected to the main body device 40 at an angle from the X direction. Therefore, a swing unit 68 and a swing cylinder 69 are provided instead of the pair of guides 48, the boom attachment base 57, the shift cylinder 58, and the like.

The swing unit 68 is pivotally supported so that a portion connected to the main body device 40 and a portion connected to the boom 53 are rotatable about the Z axis. The swing cylinder 69 is a hydraulic cylinder having one end connected to the main body device 40 and the other end connected to the swing unit 68, and performs the expansion/contraction operation by the hydraulic device 41.

In addition, the pile driving system 1 of the modification has a power generation device 8 on the upper face of the main body device 40. As the power generation device 8, power generation derived from natural energy is preferably used, and in the present modification, solar power generation using a solar panel is used. The power generated by the power generation device 8 is charged in a battery (not illustrated) and used to drive the engine 23, the hydraulic device 41, the electric motor 44, the power transmission device 95, and the like. By using power derived from natural energy in the pile driving system 1, it is possible to reduce the emission amount of carbon dioxide, which is a greenhouse gas generated by the pile driving system 1.

An inclination mechanism that inclines the power generation device 8 toward the sun may be provided between the upper face of the main body device 40 and the power generation device 8. By inclining the power generation device 8 according to the turning of the turning device 30 by this inclination mechanism, efficient solar power generation can be performed. Note that the power generation device 8 can also be applied to the pile driving system 1 of the first embodiment and the second embodiment described later, and the upper face of the main body device 40 can have a function as a power generation unit in addition to a function as a take-off and landing portion of the drone 100 and a function as a charging unit of the drone 100.

In addition, in the pile driving system 1 of the modification, a vibration power generation element 9 is provided in each of the two vibrators 63. The vibration power generation element 9 includes a piezoelectric body, and generates power by a piezoelectric effect due to deformation of the piezoelectric body by application of a force thereto. By charging the battery (not illustrated) with electric power generated by the power generation of the vibration power generation element 9, it is possible to reduce the emission amount of carbon dioxide generated by the pile driving system 1. The vibration power generation element 9 can also be applied to the pile driving system 1 of the first embodiment and the second embodiment described later. Note that the power generated by the power generation device 8 and the vibration power generation element 9 may be charged in the battery 105 of the drone 100.

Although the counter mass 43 and the jack 47 are not illustrated in FIG. 14 in order to simplify the drawing, at least one of the counter mass 43 and the jack 47 can be added to the present modification. That is, the counter mass 43, the jack 47, or both, may be added.

Second Embodiment

Figure 15:
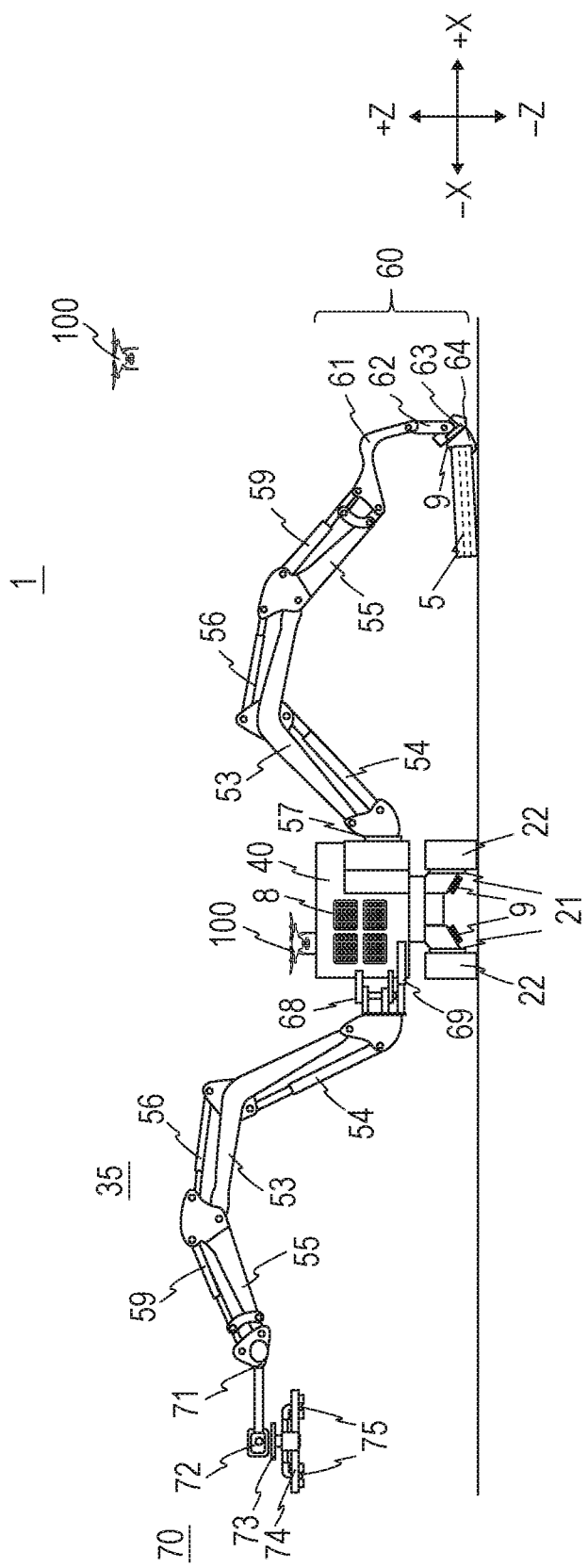
FIG. 15 is a schematic diagram of a pile driving system according to the second embodiment.
Figure 16:
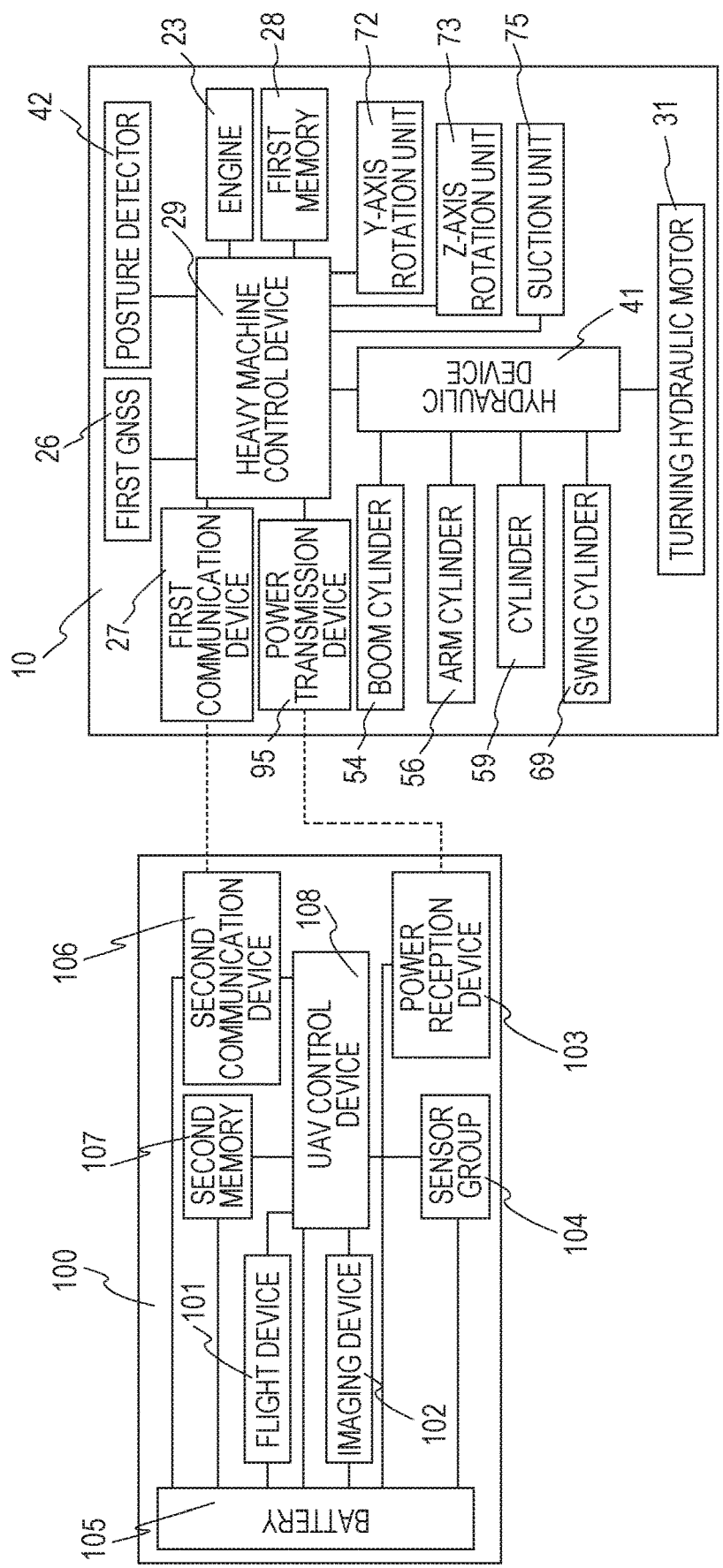
FIG. 16 is a block diagram of a pile driving system according to the second embodiment.

Hereinafter, the second embodiment will be described with reference to FIGS. 15 to 19D. The same components as those of the first embodiment are denoted by the same reference numerals, and the description thereof will be omitted or simplified. FIG. 15 is a schematic diagram of a pile driving system 1 of the second embodiment, and FIG. 16 is a block diagram of the pile driving system 1 of the second embodiment.

In the pile driving system 1 of the second embodiment, the power generation device 8 is provided on the side face of the main body device 40. When the side face of the main body device 40 is tapered and the power generation device 8 is inclined toward the sun, efficient solar power generation can be performed.

In addition, the pile driving system 1 of the second embodiment has the vibration power generation element 9 in the arm member connected to the pair of crawler belts 22 in addition to the two vibrators 63. The vibration power generation element 9 may be provided in the engine 23 and the main body of the drone 100.

In addition to the configuration of the first embodiment, the pile driving system 1 of the second embodiment includes, as the third work device 50, a third work device 35 that conveys the solar panel 67 to the pile driven pile 5.

As in the first work device 51 and the second work device 52, the third work device 35 includes the boom 53, the boom cylinder 54, the arm 55, and the arm cylinder 56, and further includes the swing unit 68 and the swing cylinder 69 described in the modification. The third work device 35 is connected to the center position of the main body device 40 via the swing unit 68 in the Y direction orthogonal to the X direction and the Z direction.

The third work device 35 has a mounting attachment 70 for attaching the solar panel 67 to the lateral beam member 66. The mounting attachment 70 includes an attachment arm 71, a Y-axis rotation unit 72, a Z-axis rotation unit 73, a main body 74, and a suction unit 75.

One end of the attachment arm 71 on the +X side is connected to the cylinder 59 that rotates the arm 55 and the mounting attachment 70. The other end of the attachment arm 71 on the –X side is connected to the Y-axis rotation unit 72.

The Y-axis rotation unit 72 includes a motor, and rotates the mounting attachment 70 about the Y-axis orthogonal to the X-axis and the Z-axis. One end of the Y-axis rotation unit 72 on the +Z side is connected to the attachment arm 71, and the other end on the –Z side is connected to the Z-axis rotation unit 73.

The Z-axis rotation unit 73 includes a motor and rotates the mounting attachment 70 about the Z-axis. One end of the Z-axis rotation unit 73 on the +Z side is connected to the Y-axis rotation unit 72, and the other end on the –Z side is connected to the main body 74.

The main body 74 has a rectangular shape with long sides and short sides, and holds the solar panel 67 using the suction unit 75. One end of the main body 74 on the +Z side is connected to the Z-axis rotation unit 73.

The suction unit 75 is formed on the main body 74, and sucks the solar panel 67 by a plurality of sucking surfaces. The suction unit 75 performs suction by means of vacuum suction using vacuum, electromagnetic suction using an electromagnet, or the like can be used. The suction unit 75 may be a hybrid suction unit including a vacuum suction unit that performs vacuum suction and an electromagnetic suction unit that performs electromagnetic suction.

The third work device 35 may function as a counter mass that corrects an unbalanced load acting on the pile driving system 1 when the first work device 51 and the second work device 52 are working. When the third work device 35 is driven as a counter mass, the jack 47 can be omitted, or the counter mass 43 can be reduced in weight or omitted. In addition, the counter mass 43 can be changed from a movable type to a fixed type. Therefore, in the block diagram of FIG. 16, the electric motor 44, the jack 47, and the like that move the counter mass 43 are omitted. Note that when the third work device 35 is moved as a counter mass, it is desirable to provide a warning lamp to call attention visually, to provide a speaker to call attention aurally, or to provide both.

The operation of the pile driving system 1 of the second embodiment configured as described above will be described below.

Description of Flowchart

Figure 17:
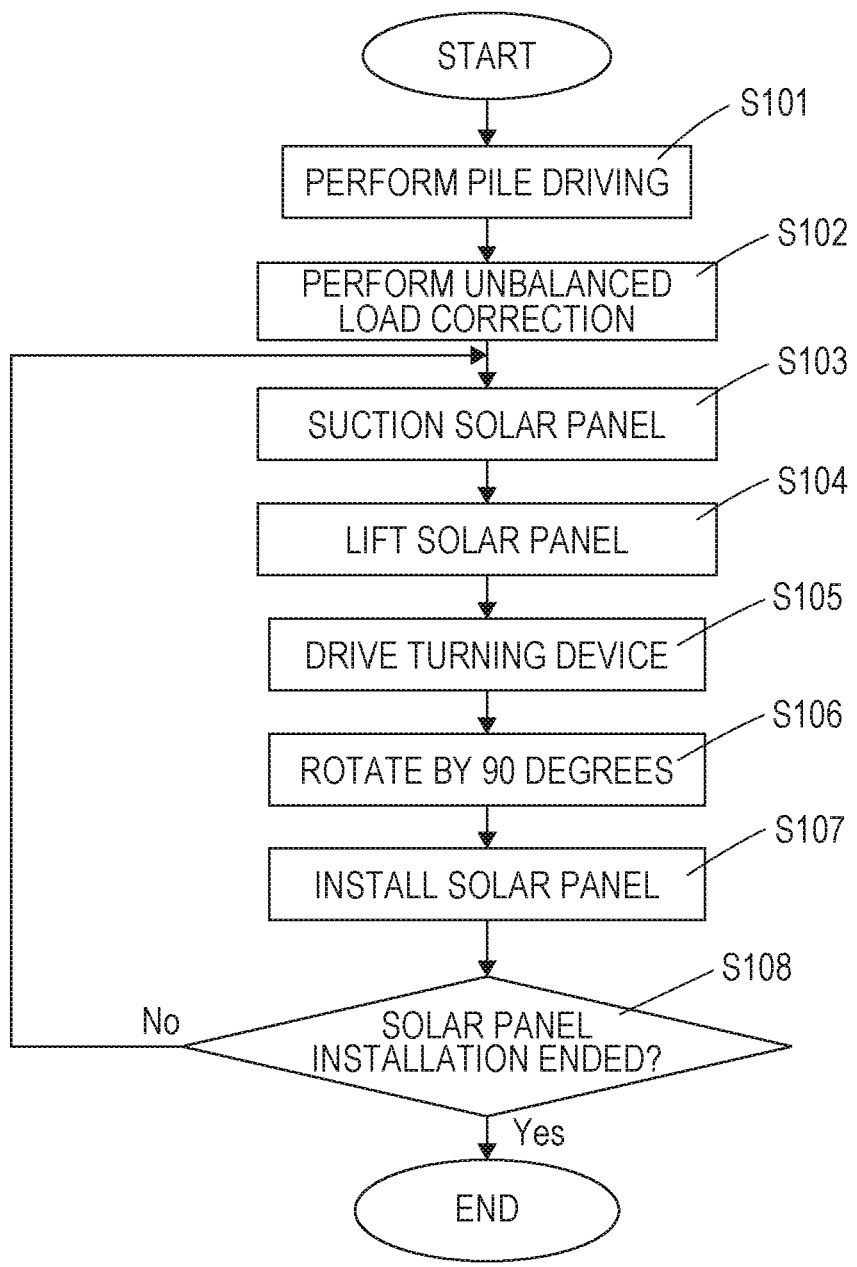
FIG. 17 is a flowchart regarding solar panel installation executed by a heavy machine control device of the second embodiment.

FIG. 17 is a flowchart regarding conveyance and installation of the solar panel 67 executed by the heavy machine control device 29 of the second embodiment. The flowchart of FIG. 17 includes some steps of pile driving in order to describe the operation of causing the third work device 35 to function as a counter mass, but is not limited these steps. In the flowchart of FIG. 17, part thereof may be performed by an operator.

Figure 18A:
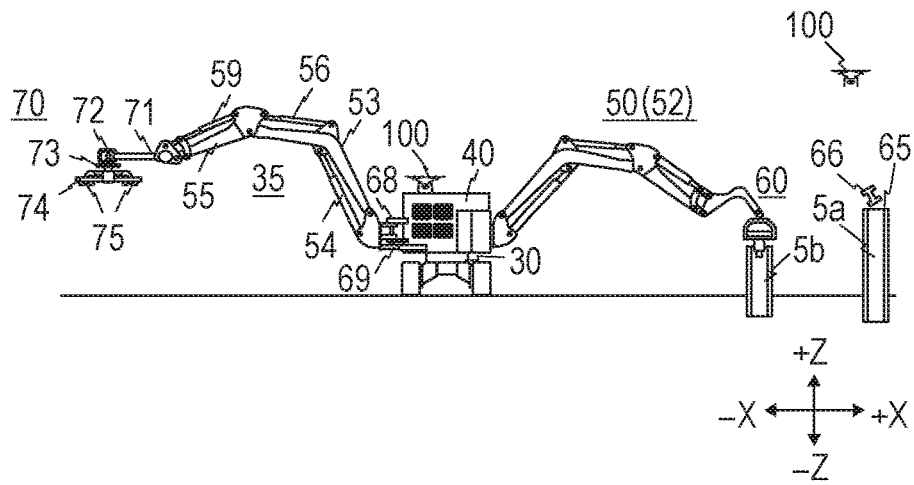
FIG. 18A is a view illustrating a state of pile driving during an operation of installing a solar panel.
Figure 18B:
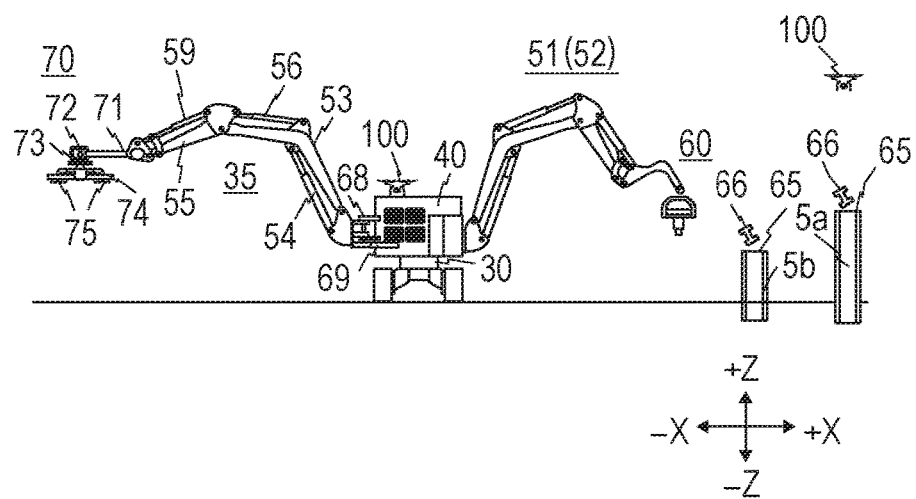
FIG. 18B is a view illustrating a state of releasing gripping of a pile during the operation.
Figure 18C:
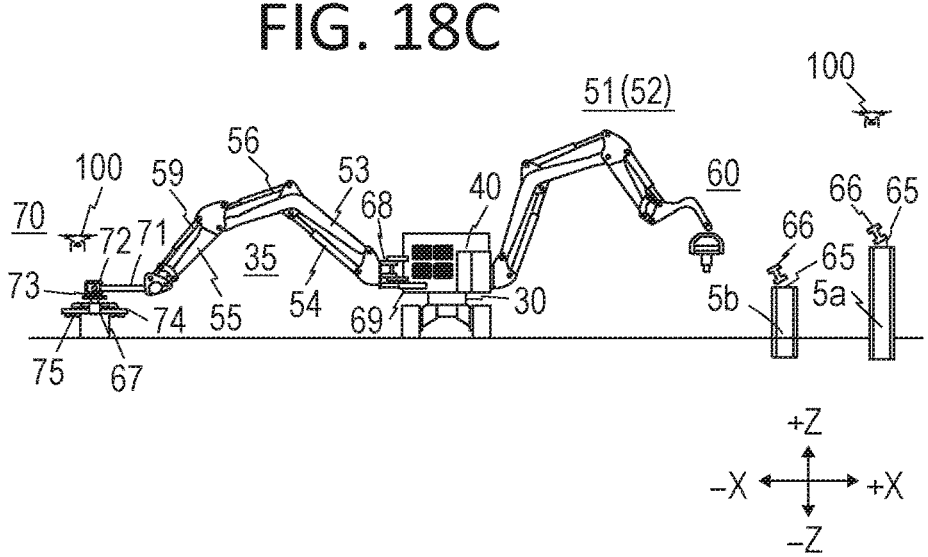
FIG. 18C is a view illustrating a state of sucking the solar panel during the operation.

FIGS. 18A through 18C are views illustrating an operation of installing the solar panel 67. FIG. 18A is a view illustrating a state of pile driving, FIG. 18B is a view illustrating a state of releasing the grip of the pile, and FIG. 18C is a view illustrating a state of sucking the solar panel 67.

Figure 19A:
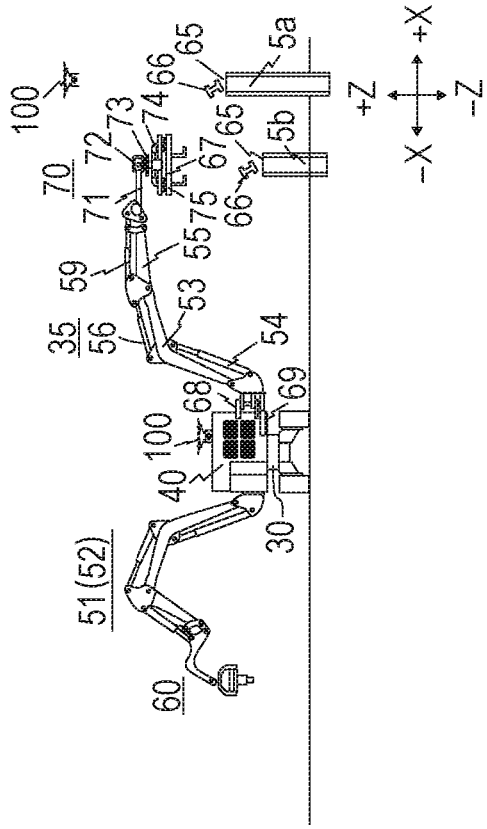
FIG. 19A is a view illustrating a state of lifting a solar panel during the operation of installing the solar panel.
Figure 19B:
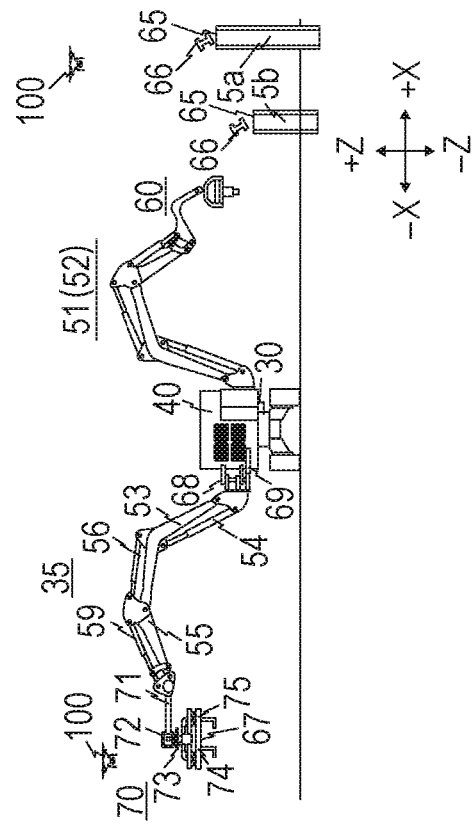
FIG. 19B is a view illustrating a state of turning during the operation.
Figure 19C:
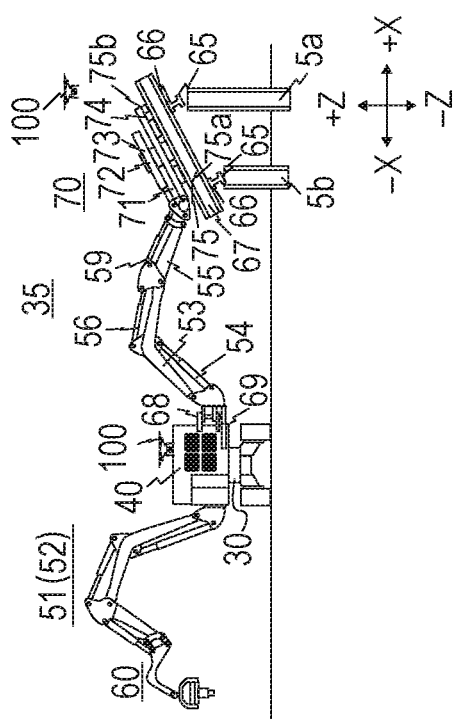
FIG. 19C is a view illustrating a state of rotating by 90 degrees during the operation.
Figure 19D:
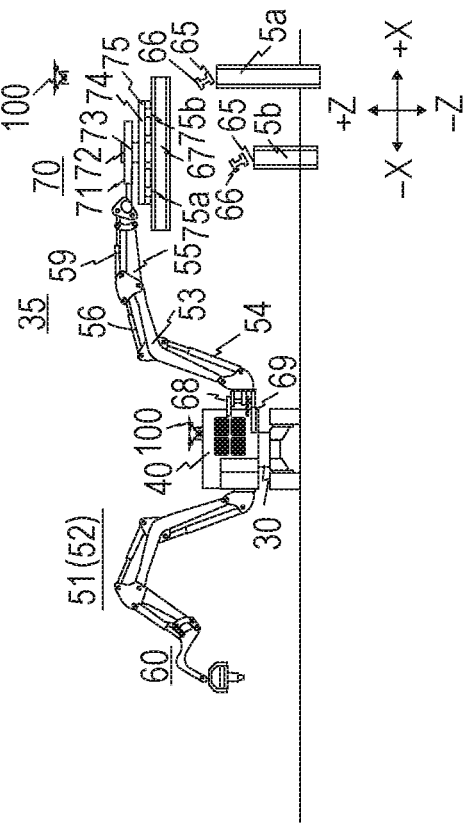
FIG. 19D is a view illustrating a state of installing the solar panel.

FIGS. 19A through 19D are also views illustrating an operation of installing the solar panel 67. FIG. 19A is a view illustrating a state of lifting the solar panel 67, FIG. 19B is a view illustrating a state of turning, FIG. 19C is a view illustrating a state of rotating by 90 degrees, and FIG. 19D is a view illustrating a state of installing the solar panel 67. In FIGS. 18A to 19D, only components necessary for description are denoted by reference numerals to avoid complication of the drawings.

Hereinafter, the flowchart of FIG. 17 will be described with reference to FIGS. 18A to 19D.

As illustrated in FIG. 18A, the heavy machine control device 29 pile drives the two short piles 5b using the first work device 51, the second work device 52, and the two pile driving attachments 60 (step S101). Note that the heavy machine control device 29 also performs steps S7 to S9 in the flowchart of FIG. 7 at the time of pile driving in step S101, the process is as described in the first embodiment, and thus description thereof is omitted.

The heavy machine control device 29 performs unbalanced load correction using the third work device 35 and the mounting attachment 70 at the time of pile driving in step S101 (step S102). The heavy machine control device 29 performs unbalanced load correction by moving the third work device 35 in the –X direction.

When the pile driving in step S101 is finished, the heavy machine control device 29 releases the gripping of the webs of the two short piles 5b from the closed state to the open state of the chuck 64. The heavy machine control device 29 may continuously perform the unbalanced load correction by moving the third work device 35 and the mounting attachment 70 according to the operation accompanying the release of the gripping of the short pile 5b. In this case, the heavy machine control device 29 may move the third work device 35 according to the output of the posture detector 42.

The heavy machine control device 29 sucks the solar panel 67 using the third work device 35 and the mounting attachment 70 (step S103). As illustrated in FIG. 18C, the heavy machine control device 29 causes the drone 100 to fly above the mounting attachment 70, and images the solar panel 67 and the main body 74 with the imaging device 102. The heavy machine control device 29 moves the third work device 35 so that the positions of the solar panel 67 and the main body 74 in the X direction and the Y direction match with each other. For the image captured by the imaging device 102, when the positions of the solar panel 67 and the main body 74 in the X direction and the Y direction match with each other, most of the solar panel 67 is hidden by the main body 74. Therefore, the heavy machine control device 29 can determine that the positions of the solar panel 67 and the main body 74 in the X direction and the Y direction match with each other by pattern matching using the reference image. The operator may make a determination on the alignment between the solar panel 67 and the main body 74 in the X direction and the Y direction.

Following the alignment of the solar panel 67 and the main body 74 in the X direction and the Y direction, the heavy machine control device 29 causes the third work device 35 to move the mounting attachment 70 in the −Z direction. Then, the heavy machine control device 29 sucks the solar panel 67 by the suction unit 75.

As shown in FIG. 19A, the heavy machine control device 29 lifts the solar panel 67 using the third work device 35 and the mounting attachment 70 (step S104).

Next, as illustrated in FIG. 19B, the heavy machine control device 29 turns the turning device 30 by 180 degrees (step S105). Note that after the end of step S105, one of the two drones 100 may land on the take-off and landing portion to perform charging.

As illustrated in FIG. 19C, the heavy machine control device 29 rotates the solar panel 67 by 90 degrees about the Z axis by the Z-axis rotation unit 73 (step S106). As illustrated in FIG. 10C, the solar panel 67 has a rectangular shape having long sides and short sides. When the long side direction of the solar panel 67 matches the X direction at the time of turning in step S105, the solar panel 67 protrudes more in the X direction than the third work device 35, and it cannot be said that it is necessarily safe. Therefore, in the present embodiment, the short side direction of the solar panel 67 matches the X direction until the turning is finished, and the solar panel 67 is rotated by 90 degrees about the Z axis by the Z-axis rotation unit 73 after the turning is finished.

When the suction unit 75 sucks the solar panel 67 from above, the solar panel 67 may drop when an abnormality occurs in the suction unit 75. For this reason, the turning device 30 may perform turning in a state where the Y-axis rotation unit 72 is rotated by 180 degrees, and the suction unit 75 sucks the solar panel 67 from below.

As illustrated in FIG. 19D, the heavy machine control device 29 causes the third work device 35 to install the solar panel 67 on the lateral beam member 66 (step S107). The positioning of the solar panel 67 with respect to the lateral beam member 66 may be performed based on the imaging result by the imaging device 102 of the drone 100, and can be performed by pattern matching using the reference image. The positioning of the solar panel 67 with respect to the lateral beam member 66 and the fastening of the solar panel 67 with respect to the lateral beam member 66 may be performed by an operator. After installing the solar panel 67 on the lateral beam member 66, the heavy machine control device 29 releases the suction of the solar panel 67 by the suction unit 75. In the present embodiment, because the solar panel 67 is a magnetic body, the suction unit 75 is a hybrid suction unit including a vacuum suction unit 75a and an electromagnetic suction unit 75b as illustrated in FIGS. 19C and 19D.

The heavy machine control device 29 determines whether the installation of the solar panel 67 is finished (step S108). When the next solar panel 67 is to be installed (step S108/NO), the heavy machine control device 29 turns the turning device 30 by 180 degrees and repeats step S103 and the subsequent steps. When the scheduled installation of the solar panel 67 has been completed (step S108/YES), the heavy machine control device 29 ends this flowchart. When ending this flowchart, the heavy machine control device 29 returns the first work device 51 and the second work device 52 to the initial positions, and moves the pile driving system 1 to a predetermined place. As described above in detail, in the second embodiment, because the solar panel 67 can be installed following the pile driving, efficient construction can be performed, and the construction period can be shortened.

The embodiments described above are merely examples for describing the present invention, and various modifications can be made without departing from the gist of the present invention. For example, when an infrared camera is used as the imaging device 102, pile driving work can be performed even at night, and the construction period can be shortened. The warning lamp and the speaker described above may be provided in a place other than the main body device 40. In addition, the first embodiment, the modification, and the second embodiment may be appropriately combined.

In addition, even in a case where the remaining amount of the battery 105 of the flying drone 100 decreases, the drone 100 that is not flying is charged. Thus, it is possible to promptly replace the drone 100 to be flown, and thus, it is not necessary to substantially consider the limitation of the flight time of the drone 100. In addition, according to the present embodiment, because the drone 100 assists the pile driving system 1, automated construction work can be efficiently realized.

The power generation device 8 can be provided not only in the pile driving system 1 but also in a construction heavy machine such as a backhoe. In this case, it is preferable to adopt the automated driving type having no driver seat as in the present embodiment. In addition, the vibration power generation element 9 can be provided not only in the pile driving system 1 but also in a machine component holding a traveling device of a construction heavy machine such as a backhoe or an engine.

The following is a list of reference signs used in the drawing figures and in this specification.

1 pile driving system
10 base machine
20 traveling device
29 heavy machine control device
30 turning device
35 third work device
40 main body device
41 hydraulic device
50 work device
51 first work device
52 second work device
60 pile driving attachment
70 mounting attachment
100 drone
102 imaging device
103 power reception device
104 sensor group
105 battery
108 UAV control device

The invention claimed is:

1. A pile driving apparatus, comprising:
a main body that travels by a traveling device;
a first pile driver that is connected to the main body and performs pile driving along a vertical direction; and
a second pile driver that is connected to the main body and performs pile driving along the vertical direction, wherein:
the first pile driver and the second pile driver are each disposed on a first side of the main body, and
an adjuster disposed on the first side and configured to adjust a position of at least one of the first pile driver or the second pile driver.

2. The pile driving apparatus according to claim 1, further comprising:
a take-off and landing portion provided in the main body; and
an unmanned flight vehicle that takes off and lands from and on the take-off and landing portion.

3. The pile driving apparatus according to claim 2, further comprising:
a communication device that communicates with a communication device provided in the unmanned flight vehicle.

4. The pile driving apparatus according to claim 2, wherein part of a power supply unit that supplies power to the unmanned flight vehicle is provided in the take-off and landing portion.

5. The pile driving apparatus according to claim 2, further comprising;
a first control device that controls the first pile driver and the second pile driver based on a survey result by the unmanned flight vehicle.

6. The pile driving apparatus according to claim 2, wherein
the unmanned flight vehicle includes an imaging unit that performs imaging, and wherein
the pile driving apparatus includes a second control device that controls at least one of the first pile driver and the second pile driver based on imaging by the imaging unit of a pile.

7. The pile driving apparatus according to claim 2, wherein the take-off and landing portion has a visually recognized mark.

8. The pile driving apparatus according to claim 1, wherein the first pile driver and the second pile driver are connected to the main body at a predetermined angle.

9. The pile driving apparatus according to claim 1, wherein the first pile driver and the second pile driver are connected to the main body so that a traveling direction of the traveling device matches a pile driving direction in which the first pile driver and the second pile driver pile drive a plurality of piles.

10. The pile driving apparatus according to claim 1, further comprising:
a first moving device that moves a mass body prior to driving of the first pile driver and the second pile driver, wherein the mass body is disposed on a second side opposite to the first side and moves away from the first pile driver and the second pile driver.

11. The pile driving apparatus according to claim 1, further comprising:
a second moving device that moves a stabilizing member toward a ground prior to driving of the first pile driver and the second pile driver.

12. The pile driving apparatus according to claim 1, wherein the main body includes a solar power generation device.

13. The pile driving apparatus according to claim 1, wherein:
the adjuster adjusts the position of the first pile driver in accordance with a position of a first pile on the first side when driving the first pile on the first side, and
the adjuster adjusts the position of the second pile driver in accordance with a position of a second pile on the first side when driving the second pile on the first side.

14. A pile driving apparatus, comprising:
a main body that travels by a traveling device;
a first pile driver that is connected to a first portion of the main body and performs pile driving; and
a conveyance unit that is connected to a second portion of the main body, different from the first portion, and conveys a component to be attached to a pile that is pile driven, wherein the conveyance unit includes a latching unit that latches the component by at least one of a vacuum suction or an electromagnetic suction.

15. The pile driving apparatus according to claim 14, wherein positioning of the conveyance unit with respect to the component is performed by an imaging device provided in an unmanned flight vehicle.

16. The pile driving apparatus according to claim 14, further comprising:
a second pile driver that is connected to the main body and performs pile driving.

17. The pile driving apparatus according to claim 14, further comprising:
a turning device that turns the main body so as to turn the conveyance unit when conveying the components by the conveyance unit.

18. The pile driving apparatus according to claim 14, wherein the conveyance unit includes a first rotator that rotates the component sucked from above by the latching unit to suck the component from below.

19. The pile driving apparatus according to claim 14, wherein the component is rectangular in shape with long and short sides, the conveyance unit includes a rotator that rotates so that the short side is aligned with in a first direction.

* * * * *